US007711813B1

(12) United States Patent
Yehuda et al.

(10) Patent No.: US 7,711,813 B1
(45) Date of Patent: *May 4, 2010

(54) METHODS AND APPARATUS FOR DISPLAYING STORAGE RESOURCES

(75) Inventors: Hanna Yehuda, Newton, MA (US); James M. Apple, Pascaog, RI (US)

(73) Assignee: EMC Corporation, Hopkinton, MA (US)

( * ) Notice: Subject to any disclaimer, the term of this patent is extended or adjusted under 35 U.S.C. 154(b) by 1685 days.

This patent is subject to a terminal disclaimer.

(21) Appl. No.: 10/879,687

(22) Filed: Jun. 29, 2004

(51) Int. Cl.
  *G06F 15/173* (2006.01)
(52) U.S. Cl. ...................... 709/224; 715/734
(58) Field of Classification Search ................ 709/224; 715/734

See application file for complete search history.

(56) References Cited

U.S. PATENT DOCUMENTS

| 4,710,763 | A  | * | 12/1987 | Franke et al. ............... 345/10 |
| 6,330,005 | B1 | * | 12/2001 | Tonelli et al. .............. 715/735 |
| 7,113,934 | B2 | * | 9/2006  | Levesque et al. .............. 707/1 |
| 7,437,676 | B1 | * | 10/2008 | Magdum et al. ............ 715/738 |
| 7,469,247 | B2 | * | 12/2008 | Cossins et al. ............... 707/10 |
| 2004/0051731 | A1 | * | 3/2004 | Chang et al. ................ 345/734 |
| 2004/0075680 | A1 | * | 4/2004 | Grace et al. ................. 345/734 |
| 2004/0085345 | A1 | * | 5/2004 | Galou et al. ................ 345/734 |
| 2004/0243945 | A1 | * | 12/2004 | Benhase et al. ............. 715/853 |
| 2009/0055719 | A1 | * | 2/2009 | Cossins et al. ............. 715/204 |

\* cited by examiner

*Primary Examiner*—William C. Vaughn, Jr.
*Assistant Examiner*—Greg Bengzon
(74) *Attorney, Agent, or Firm*—Chapin IP Law, LLC

(57) ABSTRACT

A resource manager application performs a search for managed resources (e.g., hosts, adapters, databases, host devices, etc.) associated with a storage area network. Results of the search are displayed in a first display region of a display screen. Based on selection of a particular managed resource by a user from the first display region, the resource manager populates a second display region of the display screen with corresponding additional managed resource information. The user further selects one of multiple view mode options to view different types of corresponding additional managed resource information in the second display region.

15 Claims, 14 Drawing Sheets

METHODS AND APPARATUS FOR DISPLAYING STORAGE RESOURCES

RELATED APPLICATIONS

This application is related to U.S. patent application Ser. No. 10/880,431 (now U.S. Pat. No. 7,475,363) entitled "METHODS AND APPARATUS FOR VIEWING NETWORK RESOURCES," by Hanna Yehuda and James M. Apple, which is being filed on the same date as the present application. This application is also related to co-pending U.S. patent application Ser. No. 10/879,688 entitled "METHODS AND APPARATUS FOR DISPLAYING STORAGE RESOURCES," by Hanna Yehuda and James M. Apple, which is being filed on the same date as the present application. The entire teachings of both of these applications are incorporated herein by this reference.

BACKGROUND

The rapid expansion of information service and data processing industries has created a need to manage and store large amounts of data. As an example, financial service companies such as banks, mutual fund companies or the like often operate complex data processing systems that require access to many hundreds of gigabytes or even terabytes of data and corresponding files stored in remotely located, high capacity data storage systems. Typically, data processing systems retrieve and store the data and files from the data storage systems over a network.

Data storage system developers have responded to these needs for increased capacity by integrating high capacity data storage systems, data communications devices and computer systems into networks referred to as "storage networks" or "storage area networks" (SANs.) In general, a storage area network is a collection of data storage systems that are networked with a number of host computer systems. The host computers of the storage area network operate as servers that access data stored in the data storage systems on behalf of client computers that request data from the servers.

Storage area networks are typically managed based on use of software management applications running on a corresponding network manager control station (e.g., a computer workstation) coupled to the storage area network. Conventional storage area network management applications (i.e., certain software applications) provide conventional Graphical User Interfaces (GUIs) that enable network managers to graphically manage, control and configure various types of hardware and software resources associated with a corresponding managed storage area network. One conventional network management storage application generates a graphical user interface utilized by a network manager to graphically select, interact with, and manage local or remote devices and associated software processes associated with the storage area network.

Based on use of a graphical user interface in combination with an input device such as a hand operated mouse and corresponding pointer displayed on a viewing screen, a network manager is able to manage hardware and software entities such as file systems, databases, storage devices, peripherals, network data communications devices, etc., associated with the storage area network. Typically, in such network management applications, the network manager selects a displayed icon representing a corresponding managed resource in the network and applies management commands to carry out intended management functions such as viewing hardware and software settings associated with the corresponding selected managed resource.

As noted above, a storage area network may include a number of hardware devices such as host computers, servers, data communication devices (e.g., switches, routers, etc.), network attached storage devices, proxy devices, firewall devices, and so forth that are coupled amongst each other via physical cables, circuitry, etc. Certain conventional network management applications are designed to provide a network manager with information concerning how these network resources are interrelated. For example, in one application, a network manager may select one or more icons (e.g., folders of information identifying host computers, servers, volumes, storage devices, etc.) from a hierarchical tree to display managed resources associated with a particular storage system. Based on viewing information in the hierarchical tree and/or a table of information generated based on selection of an entry in the hierarchical tree of SAN resources, the network manager can view and modify configuration settings of a corresponding managed storage area network.

In an application separate from the conventional network management applications discussed above, Microsoft™ develops software to search for files stored in a file system. Such software is often deployed on personal computers. According to one Microsoft™ application, a user can display an expandable tree of icons representing folders, sub-folders, and files stored locally or remotely over a network. The user selects a search function option while viewing the expandable tree to retrieve a list of files in the expandable having particular properties. For example, a user can perform a search in a directory or folder to find any files having a ".doc" extension. After performing the search for the files, the application displays the search results such as a list of ".doc" files to the user. The user is then able to select the files for viewing in a corresponding application suitable for viewing the selected file.

SUMMARY

Conventional software applications that support management of network resources suffer from a number of deficiencies. As discussed, certain conventional software applications (such as those developed by Microsoft™ as discussed above) enable a network manager to display a hierarchy of icons representing managed resources associated with a storage system. Based on selection of an icon (i.e., managed entity) in the hierarchy of icons, the network manager may attempt to display information on a display screen for viewing. Unfortunately, during the process of selecting an icon in an expandable tree, the network manager may select a particular folder in a hierarchical tree including attributes or relationships that are not easily displayed in the corresponding hierarchy of icons. For example, there may be an excessive number of entries to display under a particular folder in the expandable tree or the relationship of managed resources do not lend themselves to viewing in a tree.

In the event that attributes associated with a selected icon in the hierarchy are displayable and resources happen to be displayed for viewing, the network manager can scroll down such a list of items in a folder of the hierarchy to locate entries of particular interest. However, the network manager may be interested in viewing only certain types of resources or sub-resources associated with a selected folder. The network manager also may wish to view information that does not lend itself for viewing in an expandable tree. Further, the network manager also may be interested in viewing the results according to one of different types of possible viewing modes.

Conventional techniques for viewing different entries or searching for a particular type of resource in the hierarchy of icons via scrolling can be cumbersome, especially when a user wishes to compare multiple resource entries with each other, view resources only of a particular type, or view a relationship of resources in the storage area network. Also, conventional techniques are typically restricted to displaying information according to only one type of viewing mode. For example, Microsoft™ enables a user to select a folder and then view a single file in the expandable tree for viewing in a launched application (e.g., WORD, adobe, etc.) not associated with the search engine. The aforementioned problems are exacerbated in applications such as high capacity storage area network applications because, as mentioned, a folder (i.e., a managed network resource) may contain hundreds or even thousands of entries of files. In such circumstances, conventional network management applications do not enable a network manager to quickly and efficiently display information associated with particular managed resources of interest. Nor do conventional software applications provide an efficient way for displaying or conveying a relationship of managed entities in an expandable tree with respect to each other.

Embodiments of the invention significantly overcome the aforementioned and other deficiencies of conventional network management applications. In particular, embodiments of the invention include mechanisms and techniques for displaying network resources via use of a graphical user interface rendered on a computer display screen. In one embodiment of the invention, the graphical user interface enables a user such as a network manager to selectively display different types of information for viewing relationships of managed entities on a viewing screen depending on selection of one of multiple possible view modes. For example, a user may perform a search for a particular type of resource in a storage area network. The application performing the search presents a table of search results including multiple resource entries for the network manager to select and view in a separate display region to view a relationship between a selected entry in the results table and other resources in the storage area network. In one application, resource entries selected from the table of search results may be viewed according to a tabular view, network topology view, etc. based on a view mode selected by a user.

Conventional applications such as those developed by Microsoft™ are limited to picking an entry in a hierarchy of icons for viewing only a single folder of information based on a pre-selected view mode. Thus, there is no easy way according to conventional methods to selectively view different types of information and relationships associated with a particular folder selected from an expandable tree based on further selection of different types of view modes. Certain embodiments of the invention extend to network management software incorporating the functionality as explained herein, as well as to computerized devices configured to operate as explained herein.

Embodiments of the invention thus allow a network manager to selectively view storage system resources and corresponding sub-resources such as storage area network components configured within a storage system. The storage system components (e.g., hardware, software, configuration information, etc.) can be selectively displayed in different views (such as tabular view, network topology view, etc.) which include at least a partial identification of host resources (e.g., host computer, host adapters, and host adapter ports), switch resources (e.g., switches and switch ports), and storage device resources (i.e., storage system or storage array) associated with a storage area network. Embodiments of the invention thus allow a network administrator to select which resources shall be viewed on a display screen and, thereafter, quickly display such information in different view modes for optimal viewing by a user.

In view of the aforementioned embodiments, one embodiment of the invention involves a technique of utilizing a resource manager (e.g., an application executed by a processor, a processor function, etc.) to perform a search for managed resources associated with a storage area network. The resource manager displays results of the search in a first display region for viewing by a user. The results of the search include a set of managed resources (e.g., hosts, adapters, databases, host devices, etc.) associated with the storage area network. The resource manager displays the first display region along with a separately located second display region for simultaneous viewing by the user. Thus, a user may view the first display region of search results as well as the second display region of additional managed resources.

The resource manger enables the user to selectively display additional managed resource information associated with the set of managed resources displayed in the first display region by populating the second display region with different additional managed resource information associated with the storage area network depending on which managed resource in the first display region has been selected by the user. In one embodiment, the resource manager provides the additional managed resource information in the second display region for illustrating a relationship between a selected managed resource entry in the first display region and other managed resources associated with the storage area network.

Thus, according to one embodiment of the invention, the user may select different view modes to selectively display a relationship between a managed resource displayed in the first display region and other managed resources of the storage area network. For example, a user may select to view a relationship between a selected managed resource entry in the first display region and other managed resources associated with the storage area network one way via a first view mode. Based on selection of a second view mode, a user may view a relationship between the selected managed resource entry in the first display region and other managed resources associated with the storage area network in another way. In one application, a user may view a relationship of managed resources of the storage area network in a tabular view mode or network topology view mode. This overall technique of providing a search capability and then enabling a user to view a relationship of managed resources based on different view modes enables a user to more quickly and efficiently research and review system attributes such as groupings, configurations, etc. of the storage area network. Maintenance of the storage area network is therefore a simpler task for a network manager.

In further more specific embodiments and potentially other independent embodiments of the invention, the resource manager displays an expandable tree of managed resources on a display screen for a user. Based on input from the user, the resource manager receives selection of a managed resource in the expandable tree. In response to activation of a search mode icon (which is potentially continuously displayed in relation to the expandable tree) by the user to initiate a search, the resource manager provides a search window (e.g., pop-up window) for entering search parameters to be used in the search. Based on the search parameters, the resource manager performs a search for corresponding managed resources associated with the storage area network. The search may involve searching the expandable tree for resource entries of a particular type, name, etc.

The resource manager displays results of the search in a first display region for viewing by a user. The results of the search include a set of managed resources (e.g., a particular type of hosts) associated with the storage area network. As discussed, the resource manager displays the first display region of search results along with a separately located and maintained second display region of resources for simultaneous viewing by the user. The additional managed resource information in the second display region illustrates a relationship between a selected managed resource entry in the first display region and other managed resources associated with the storage area network.

In furtherance of the present embodiment, the resource manager receives selection of a particular resource from the set of managed resources displayed in the first display region based on, for example, the user clicking a mouse. In response, the resource manager then provides selectable view mode options in first display region for the user to select different view modes for displaying information associated with the particular resource in the second display region. In one application, the user right clicks an entry (e.g., a managed resource of the storage area network) in the first display region to select, via a pull-down menu, how to view corresponding managed resources associated with the "clicked on" entry in the second display region.

In one embodiment, the resource manger enables the user to selectively change between two or more different view modes of the second display region such as between a tabular view mode and a network topology view mode. Other embodiments of the invention support select viewing of a properties view mode, relationship view mode, command history view mode, alerts view mode, topology view mode, and performance view mode associated with the storage area network.

The tabular view mode, when selected as a display mode for the second region, includes rows and columns of sub-resource information associated with the selected managed resource entry in the first display region. The network topology view mode, when selected as a display mode for the second region, provides an illustration of connectivity of host resources, switch resources, and storage resources of the storage area network associated with the selected managed resource entry in the first display region. The resource manager displays the information associated with the particular resource in the second display region based on the received selection of the view mode option in the first display region. In other words, a user selects a view mode of the second display region based on selection of a view mode option displayed in the first display region.

According to another embodiment of the invention, the resource manager performs a search for managed resources associated with the storage area network based on input from a user. The resource manager then displays results of the search in a first display region for viewing by a user. The results of the search include a set of managed resources associated with the storage area network. The resource manager further i) displays the first display region of results along with a separately located second display region for simultaneous viewing of the first display region and second display region by the user and ii) in the second display region, displays additional sub-resource information associated with a selected managed resource entry in the first display region. While continuing to display the results of the search in the first display region along with the additional sub-resource information in the second display region, the resource manager enables the user to selectively change a view mode of the second display region based on input to the first display region to view a relationship between the selected managed resource entry in the first display region and other managed resources associated with the storage area network. For example, the resource manager enables the user to selectively change a view mode of the second display region between a tabular view mode and a network topology view mode based on an input command to the first display region, both of which display the additional sub-resource information to the users in the second display region but in different ways. In one embodiment, the resource manager populates the second display region with information to at least partially indicate a relationship among host resources, switch resources, and storage resources associated with the storage area network.

As discussed, techniques of the invention are well suited for use in applications in which a network manager or user manages a storage area network including many managed resources that are not easily displayed in an expandable hierarchical tree and especially applications that provide a benefit of viewing a relationship of managed resources associated with a storage area network. However, it should be noted that embodiments of the invention are not limited to use in such applications and, thus, embodiments of the invention are well suited for other applications as well.

Other embodiments of the invention include a computerized device (e.g., a host computer, workstation, etc.) configured to support the aforementioned method operations disclosed herein as embodiments of the invention to provide selectable viewing modes as discussed. In such embodiments, the computerized device includes a display, a memory system, a processor (e.g., a processing device) and an interconnect. The interconnect supports communications among the display, the processor and the memory system. The memory system is encoded with a resource management application (e.g., resource manager) that, when executed on the processor, produces a resource management process that includes a graphical user interface produced on the display of the computerized device. The graphical user interface allows the resource management process to perform any of the method embodiments and operations explained herein.

Yet other embodiments of the invention disclosed herein include software programs to perform the method embodiment and operations summarized above and disclosed in detail below under the heading Detailed Description of Preferred Embodiments. More particularly, a computer program product (e.g., a computer-readable medium) including computer program logic encoded thereon may be executed on a computerized device to support generation and display of filter views and associated operations as explained herein. The computer program logic, when executed on one or more processor devices or logic devices in a computing system, causes the devices to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention.

One more particular embodiment of the invention is directed to a computer program product that includes a computer readable medium having instructions stored thereon for supporting management of network resources. The instructions, when carried out by a processor of the first data communication device, cause the processor to perform the steps of: i) performing a search for managed resources associated with the storage area network, ii) displaying results of the search in a first display region for viewing by a user, the results including a set of managed resources associated with the storage area network, iii) displaying the first display region of results along with a separately located second display region for simultaneous viewing by the user along with the first display region, and iv) enabling the user to selectively display additional managed resource information associated with the set of managed resources displayed in the first display region by populating the second display region with different additional managed resource information associated with the storage area network depending on which managed resource in the first display region has been selected by the user. Other embodiments of the invention include software programs to perform any of the method embodiment steps and operations summarized above and disclosed in detail below.

It should be understood that the system of the invention can be embodied as a software program or as a software program operating in conjunction with corresponding hardware. Example embodiments of the invention may be implemented within EMC's Control Center (ECC) software application that provides graphical management functionality for storage area network resources and in computerized devices that operate the Control Center (ECC) software. Control Center software is manufactured by EMC Corporation of Hopkinton, Mass., USA.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF PREFERRED EMBODIMENTS

According to one embodiment of the invention, a resource manager application performs a search for particular managed resources (e.g., hosts, adapters, databases, host devices, etc.) associated with a storage area network. Results of the search are displayed in a first display region of a display screen. Based on selection of a particular managed resource by a user from the first display region, the resource manager populates a second display region of the display screen with corresponding additional managed resource information. The user further selects one of multiple view mode options to view different types of corresponding additional managed resource information in the second display region. The user may select a view mode option for viewing the different types of additional managed resource information before, during, or after selecting the particular managed resource from the first display region.

Figure 1:
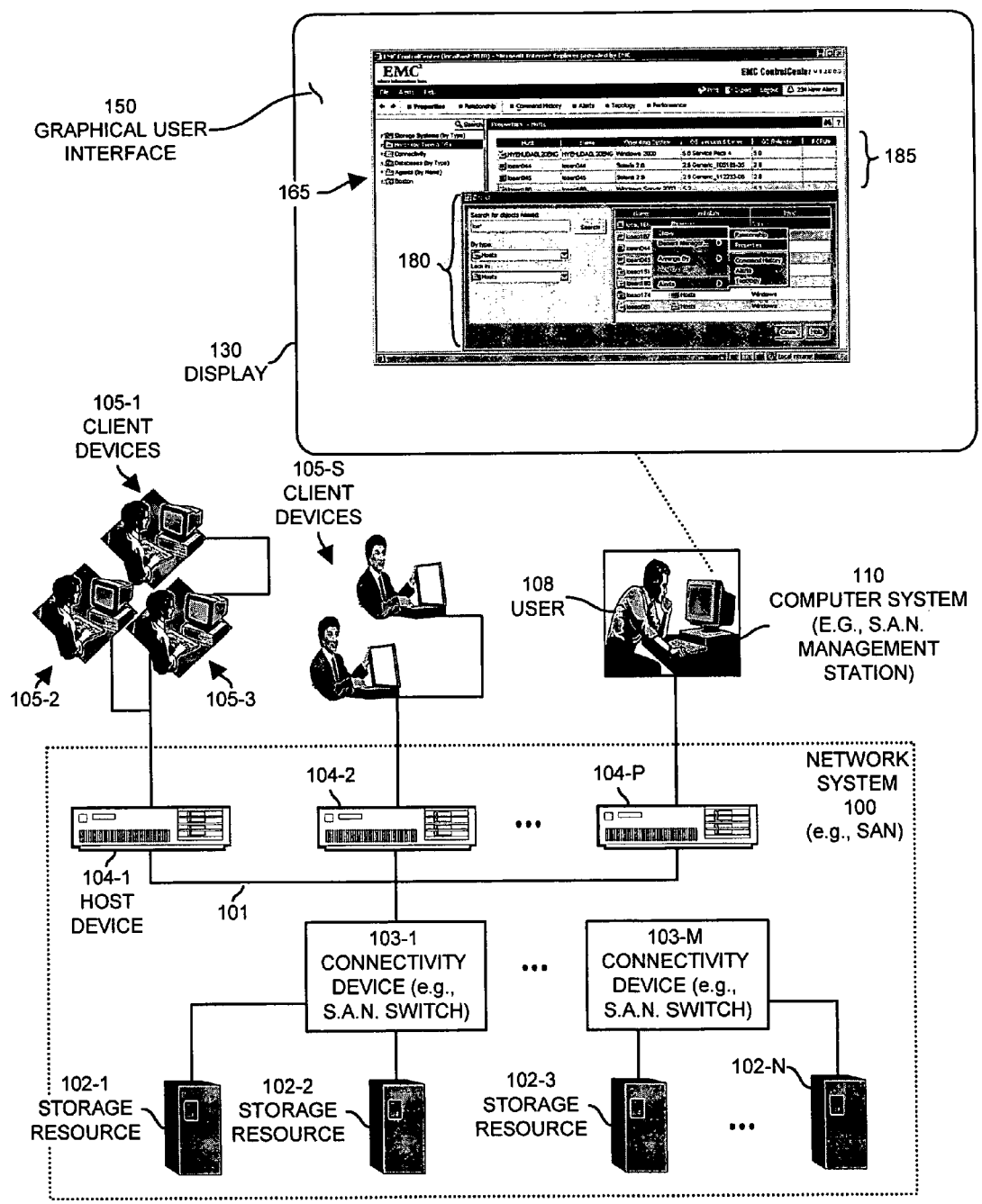
FIG. 1 is a block diagram of a storage area network and management station configured to operate according to an embodiment of the invention.

FIG. 1 illustrates a network system 100 (e.g., a storage area network) suitable for explaining further operations of example embodiments of the invention. As shown, the network system 100 includes a network medium 101 such as a high-speed data communications medium (e.g., Ethernet, optical network, or other type of network) that interconnects a plurality of components such as storage resources 102-1, 102-2, . . . 102-N, storage area network switches 103-1, . . . 103-M (i.e., connectivity devices), host devices (e.g., host servers) 104-1, 104-2, . . . 104-P, client devices 105-1, 105-2, . . . 105-S, and computer system 110 (e.g., a storage area network management station).

Computer system 110 is configured, in this example, as a storage area network management station operated by network manager or user 108 (e.g., a user responsible for managing the resources within the storage area network 100). Computer system 110 executes a resource manager application 120 (e.g., a software graphical user interface application more particularly shown in FIG. 2) that generates and displays information in accordance with embodiments of the invention as will be explained herein. The resource manager 120 in this example may be any type of network management software application that executes, performs or otherwise operates within the management station computerized system 110. It should be noted that computer system 110 may include certain other components such as one or more internal devices as well as software applications or processes that operate within or in conjunction with the illustrated components and devices in FIG. 1.

As shown towards the top of FIG. 1, the management station computer system 110 (e.g., a computer device) includes a corresponding display 130 (e.g., a monitor or other visual display device) which resource manager 120 controls to display a graphical user interface 150 as explained herein. User 108 provides input commands to control what information (e.g., tables, pop-up screens, etc.) is displayed on display 130.

The graphical user interface 150 configured in accordance with embodiments of the invention includes a first display region 180 and a second display region 185 on display 130. The first display region 180 includes a window to search for managed resources associated with a selected icon in expandable tree 165 (e.g., a hierarchical arrangement of vertically disposed icons 165). The second display region 170 displays different types of managed resources associated with a selection from the first display region 180. The user 108 viewing display 130 selects different view modes for displaying information in second display region 185.

Figure 2:
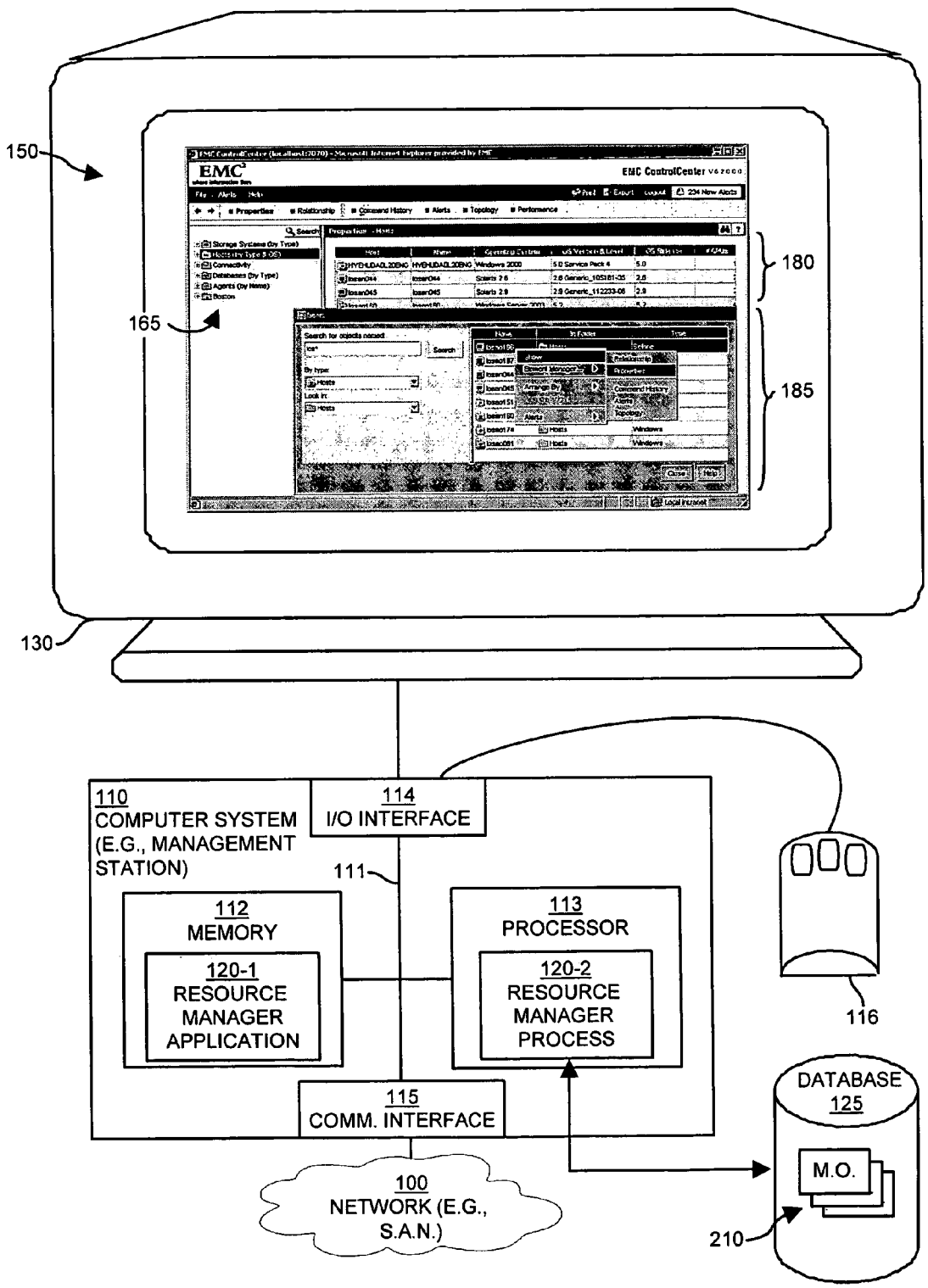
FIG. 2 is a block diagram of a processing device for executing techniques according to an embodiment of the invention.

FIG. 2 is a block diagram illustrating an example architecture of computer system 110 (e.g., a storage area network management station) according to embodiments of the invention. Computer system 110 may be a computerized device such as a personal computer, workstation, portable computing device, console, network terminal or the like. As shown, computer system 110 of the present example includes an interconnect 111 that couples a memory 112, a processor 113, an input/output interface 114 and a communications interface 115. Peripheral device 116 (e.g., one or more viewer controlled devices such as a keyboard, mouse, etc.) couples to processor 113 through I/O interface 114 and enables user 108 to provide input commands and thus control display management functions associated with graphical user interface 150. Database couples to computer system 110. In other embodiments, computer system 110 accesses database 125 over a network. Thus, database 125 and computer system 110 need not be co-located.

In general, database 125 stores managed objects 210 associated with managed entities (e.g., hardware and software resources, configurations, etc. associated with host devices 104, storage resources 102, etc.) in network system 100. Communications interface 115 enables computer system 110 (and corresponding user 108) to communicate with other devices (i.e., resources) associated with network 100.

As shown, memory 112 is encoded with resource manager application 120-1 supporting generation, display, and implementation of functional operations of graphical user interface 150. Resource manager application 120-1 may be embodied as software code such as data and/or logic instructions (e.g., code stored in the memory or on another computer readable medium such as a disk) that supports processing functionality according to different embodiments of the invention as described herein. During operation, processor 113 accesses memory 112 via the interconnect 111 in order to launch, run, execute, interpret or otherwise perform the logic instructions of the resource manager application 120-1. Execution of resource manager application 120-1 produces processing functionality in resource manager process 120-2. In other words, the resource manager process 120-2 represents one or more portions of the resource manager application 120-1 (or the entire application 120-1) performing within or upon the processor 113 in the computerized device 110.

It should be noted that the resource manager 120 executed in computer system 110 is represented in FIG. 2 by either one or both of the resource manager application 120-1 and/or the resource manager process 120-2. For purposes of the discussion of the operation of embodiments of the invention, general reference will be made to the resource manager 120 as performing the various steps and functional operations to carry out the features of embodiments of the invention.

It should be noted that embodiments of the invention include the resource manager application 120-1 itself (i.e., the un-executed or non-performing logic instructions and/or data). The resource manager application 120-1 may be stored on a computer readable medium such as a floppy disk, hard disk or in an optical medium. The resource manager application 120-1 may also be stored in a memory such as firmware, read only memory (ROM), or, as in this example, as executable code within the memory system 112 (e.g., within Random Access Memory).

In addition to these embodiments, it should also be noted that other embodiments of the invention include the execution of resource manager application 120-1 in processor 113 as the resource manager process 120-2. Thus, those skilled in the art will understand that the computer system 110 may include other processes and/or software and hardware components, such as a computer operating system that controls allocation and use of hardware resources.

Display 130 need not be coupled directly to computer system 100. For example, the resource manager 120 can be executed on a remotely accessible computerized device. In this instance, the graphical user interface 150 may be displayed locally to the user, while the resource manager process 120 is executed remotely.

To generate displayed information in graphical user interface 150, the host computer system 110 (e.g., the resource manager process 120-2) extracts information from managed objects 210 stored in database 125. For example, in one embodiment, the resource manager 120 receives an identity of at least one selected network resource (e.g., a storage system) associated with the storage area network. Based on the selected network resource, the resource manager 120 extracts information associated with the managed objects 210 associated with the selected network resource as well as other related managed objects 210 from management database 125. The managed objects 210 store information identifying relationships with other managed objects 210.

As mentioned, graphical user interface 150 generated by resource manager 120 (more particularly, processor 113) provides user 108 the ability to selectively display information associated with a storage system such as a storage area network. For example, based on processing of retrieved information from database 125, the resource manager 120 provides a view (in table 178) of sub-resources associated with a selected one or more resource identified in the first region 160 of display 130.

In one embodiment, computer system 110 extracts information from database 125 using SQL (Structured Query Language) and stores the information in data structures for processing. For example, database 125 contains managed objects 210 (e.g., database records, tables, data structures, etc.) associated with various hardware and software resources or entities associated with network system 100. Computer system 110 utilizes information in the managed objects 210 to identify what resources are related to a selected managed resource.

As discussed, database 125 includes managed objects 210 corresponding to network resources in network system 100. More details regarding potential information stored in managed objects 210 and system configuration will be discussed in connection with FIG. 3.

Figure 3:
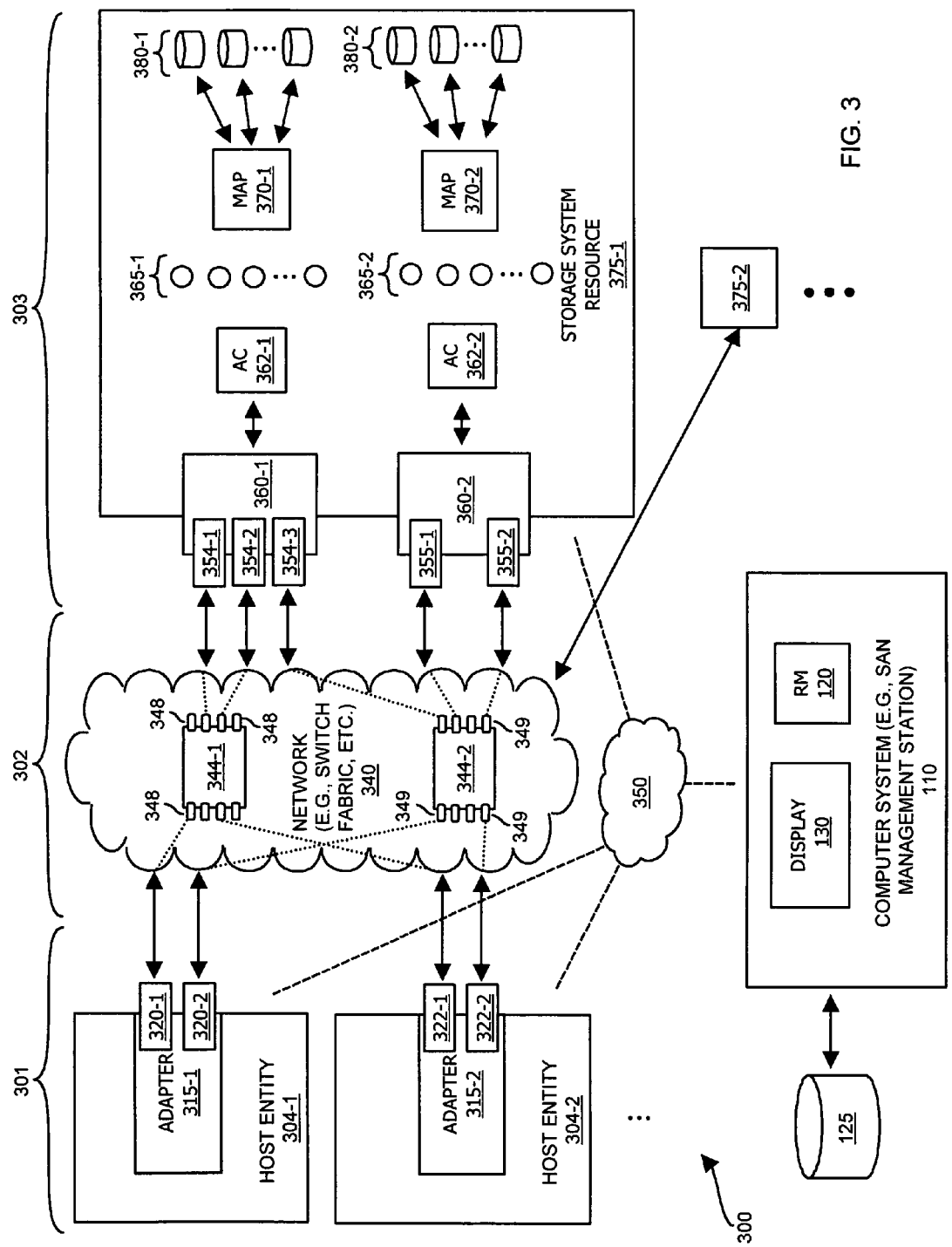
FIG. 3 is a block diagram illustrating a relationship between host resources, switch resources, and storage resources for viewing in a display application according to an embodiment of the invention.

FIG. 3 is a block diagram illustrating connectivity of network resources (e.g., host resources 301, switch resources 302, and storage resources 303) in a storage area network 300 according to an embodiment of the invention. Note that storage area network 300 can include hundreds or thousands of resources of a particular type due to a potentially enormous size of such an overall storage system.

As shown, storage area network 300 includes host entity 304-1 and host entity 304-2, etc. (collectively, host entities 304), network 340 (e.g., a high speed fiber based switch fabric), network 350 (e.g., LAN, WAN, Internet, intranet, etc.), storage system resource 375-1, storage system resource 375-2, etc., computer system 110, and database 125. Network 340 includes switch device 344-1, switch device 344-2 and corresponding switch ports 348 and 349. Host entity 304-1 includes adapter 315-1 and corresponding port 320-1 and port 320-2 to communicate over network 340. Similarly, host entity 304-2 includes adapter 315-2 and corresponding port 322-1 and port 322-2 to communicate over network 340. Storage system resource 375-1 includes respective adapters 360-1 and 360-2, corresponding ports 354-1, 354-2, 354-3, 355-1 and 355-2, access controllers 362-1 and 362-2, storage devices 365-1 and 365-2, maps 370-1 and 370-2, as well as physical storage devices 380-1 and 380-2. Database 125 stores connectivity information associated with the above components. In general, storage area network 100 may include any number of the illustrated resources.

As discussed, client devices 105 couple to corresponding host entities 304-1. Storage area network 300 provides host entities 304 (e.g., clients, host computers, etc.) access to storage system resources 375 via network 340. For example, host entity 304-1 couples to network 340 via adapter 315-1 and corresponding ports 320. Ports 320 couple to respective ports 348 and 349 on switch devices 344. In turn, ports 348 and 349 of switch devices 344 couple to ports 354 and 355 of corresponding storage system resources 375. Thus, switch devices 344 and corresponding ports 348 and 349 form at least part of a connection path between host entities 304 and corresponding storage system resources 375. Based on the aforementioned storage system topology, clients 105 are able to access storage system resources through corresponding host entities 304. Note that the configuration shown in FIG. 3 can be modified to support different types of connectivity paths between host resources 301 and storage resources 303.

Storage system resource 375-1 includes access controllers 362 to facilitate access to corresponding storage devices 365 (e.g., logical storage space in a storage system). Storage devices 365 are configured as logical portions of one or more physical storage devices 380 (e.g., arrays of storage disks). Maps 370 provide a mapping of storage devices 365 (e.g., a logical volume or a portion of a logical volume) to corresponding physical storage devices 380.

Each host entity 304 is typically limited to accessing certain storage devices 365 in storage system resource 375-1 based at least in part on configuration settings of switch devices 344 of network 340. In one embodiment, each of switch ports 348 and 349 are assigned to support a particular SAN in network 340. Host entities 304 associated with the particular SAN access storage system resources 375 via routing through switch devices 344.

Figure 4:
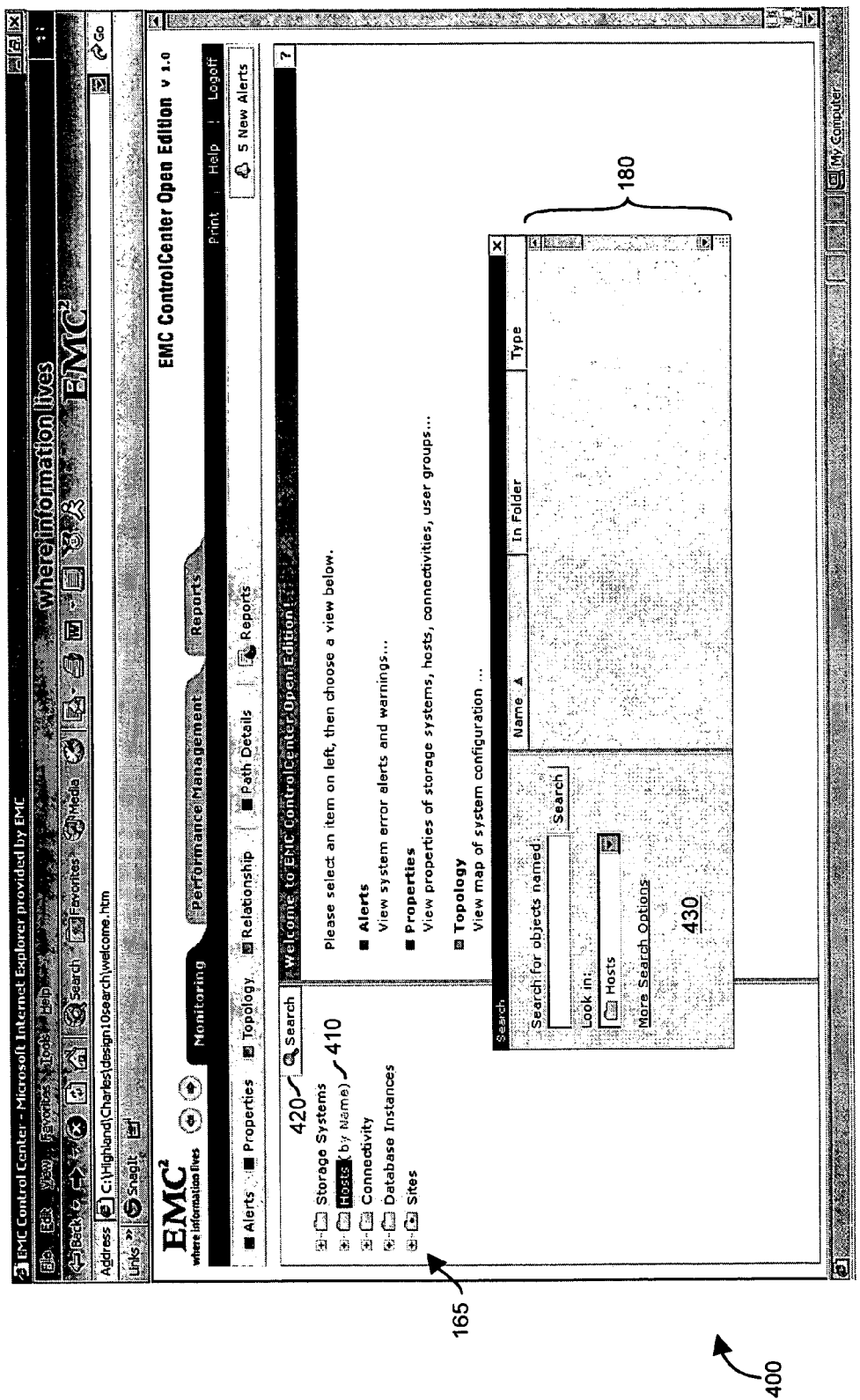
FIG. 4 is a screenshot of a graphical user interface according to an embodiment of the invention.
Figure 5:
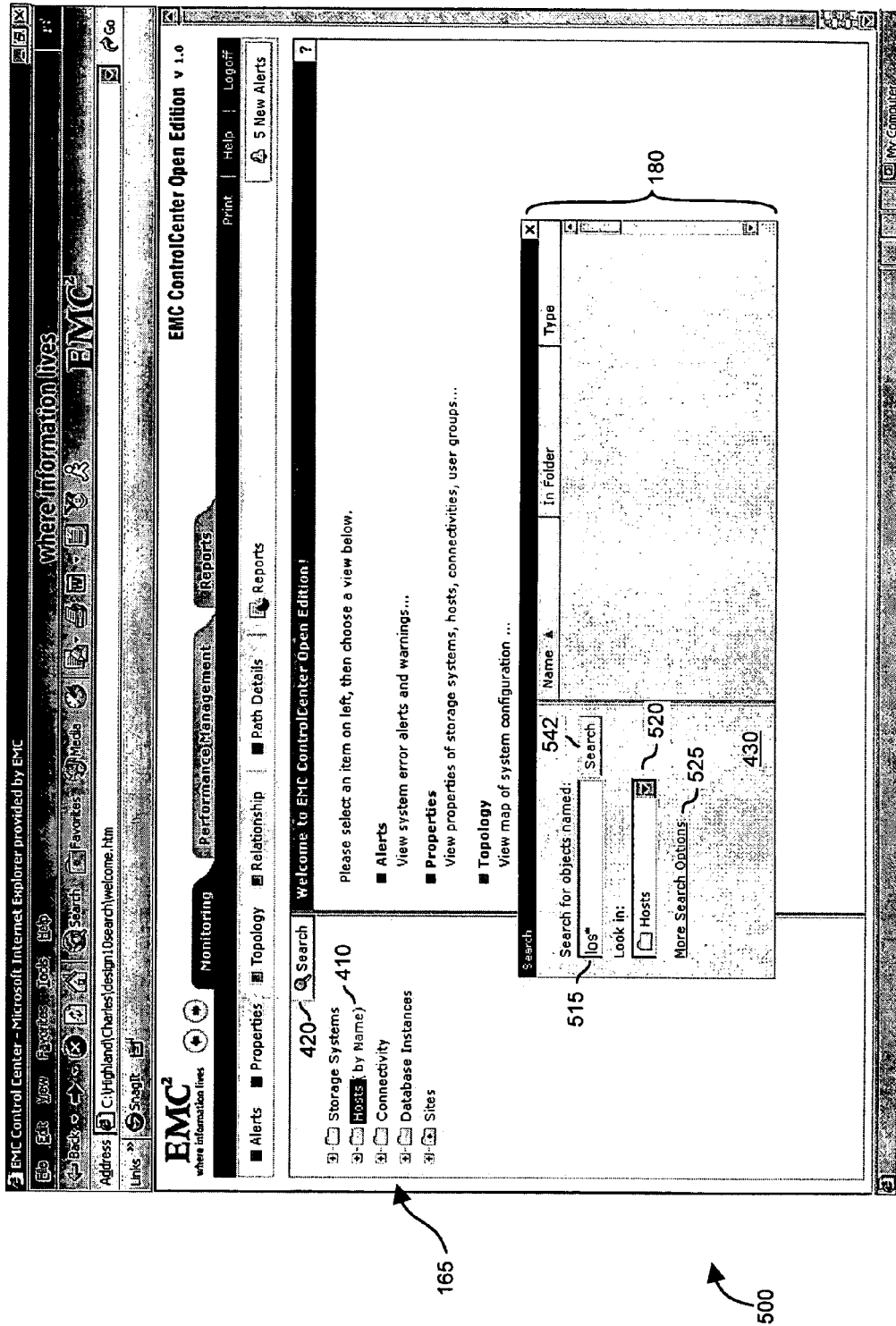
FIG. 5 is a screenshot of a graphical user interface according to an embodiment of the invention.
Figure 6:
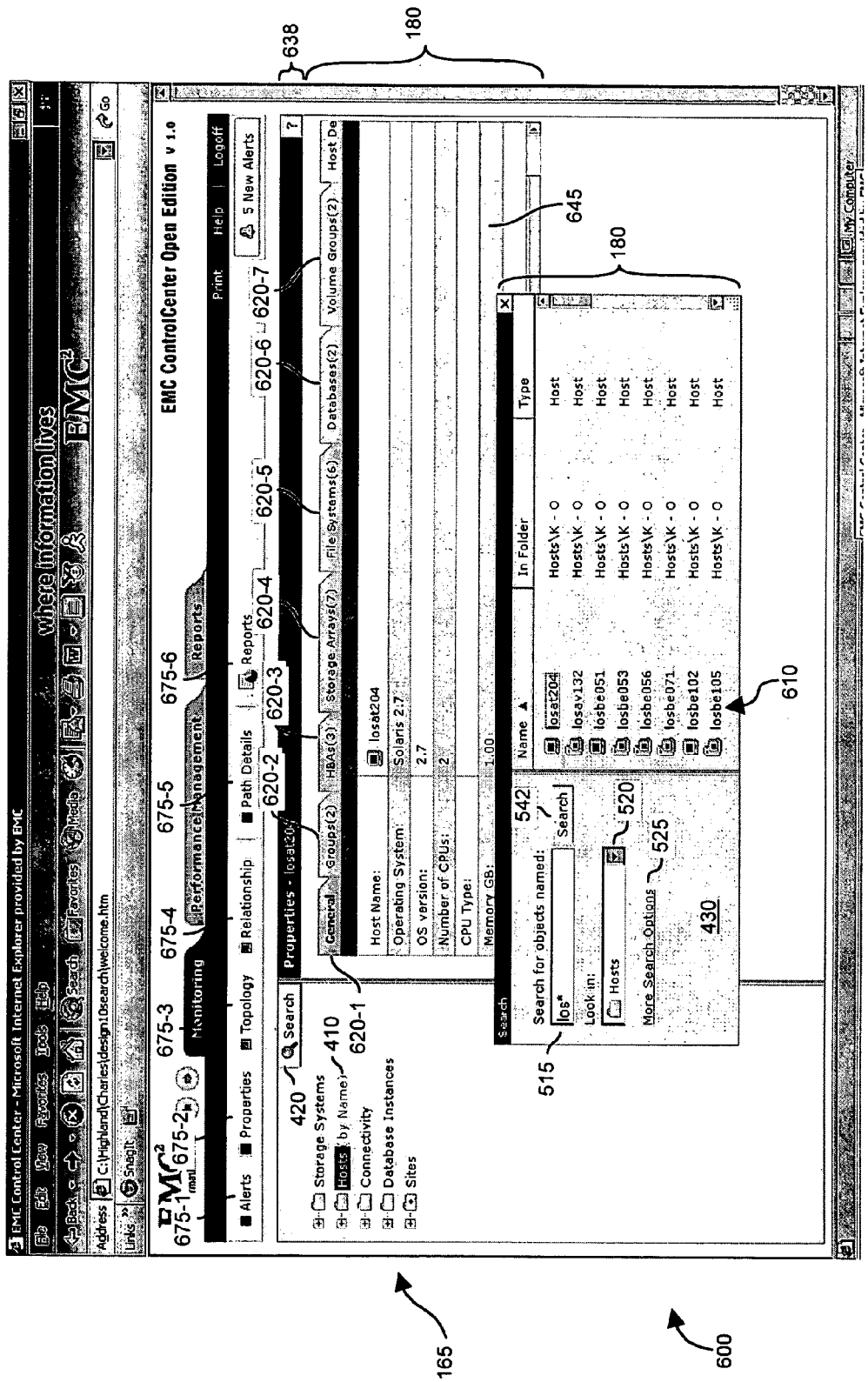
FIG. 6 is a screenshot of a graphical user interface according to an embodiment of the invention.

In general, the sequence of FIGS. 4, 5 and 6 illustrate techniques of searching and displaying managed resources of storage area network 300 on display 130 according to embodiments of the invention.

FIG. 4 is a screenshot 400 on display 130 according to an embodiment of the invention. As shown, screenshot 400 includes expandable tree 165 of icons representing managed objects 210 (e.g., hardware resources, software resources, configuration information, etc.) or managed resources associated with storage area network 300 as previously shown and discussed in connection with FIG. 3.

As shown, user 108 clicks on managed resource 410 labeled "hosts" in expandable tree 165. Thereafter, the user clicks on search button 420. In response to the activation of search button 420, the resource manager displays search window 430 in first display region to user 108. In general, the search window 430 enables user 108 to focus on reviewing different types of resources of storage area network 100.

In furtherance of FIG. 4, FIG. 5 is a screenshot 500 on display 130 according to an embodiment of the invention. User 108 provides search parameters in search window 430 to locate managed resources of a particular type. For example, as shown, user 108 provides text (e.g., "los*") in data field 515 of search window 430 to search for any objects having the term "los" in their name. Resource manager 120 supports other wild card search terms in addition to the "*" entry.

Selected managed resource 410 identifies at least a possible starting point for performing a search. However, the scope of a search can be modified based on selection of different search areas based on further refining of the search scope via pull-down menu 520 and additional search options 525. To activate a search based on search parameters supplied in search window 430, user 108 clicks on search icon 542 in search window 430.

In furtherance of FIG. 5, FIG. 6 is a screenshot 600 on display 130 according to an embodiment of the invention. As a result of performing the search, resource manager populates first display region 180 to include search results 610 of managed resources. Based on selection of "losat204" in search results 610, the resource manager 120 populates second display region 185 with table 645 and corresponding information associated with "losat204". View mode header 638 provides an indication to user 108 of the view mode associated with the second display region 185. For example, as shown, view mode header 638 indicates that second display region 185 and, more particularly, table 645 includes information such as additional managed resource information associated with host "losat204" selected from search window 180.

According to one embodiment, user 108 may click on selectable view mode icons 675 (e.g., selectable view mode icon 675-1, selectable view mode icon 675-2, selectable view mode icon 675-3, etc.) to change a type of information that resource manager 120 displays in second display region 185 for viewing. For example, user 108 can click on view mode icon 675-1 to change the second display region 185 to include an "alerts" view mode rather than a properties view mode associated with selected host "losat204" in search window 430. This embodiment as well as other related embodiments will be further discussed in the following figures.

Resource manager 120 potentially displays selectable view mode icons 675 continuously to the user 108. The resource manager supports different display modes based on use of: a.) a properties view mode icon 675-2 for selecting a view mode supporting a display of properties information in the storage area network, b.) a relationship view mode icon 675-4 for selecting a view mode supporting a display of a relationship of managed resources with respect to each other in the storage area network c.) an alerts view mode icon 675-1 for selecting a view mode supporting a display of system alerts and warnings associated with the storage area network, d.) a topology view mode icon 675-3 for selecting a view mode supporting a display of physical connectivity associated with the storage area network, e.) a performance view mode icon for selecting a view mode supporting a display of performance information associated with the storage area network, and f.) a command history view mode icon for selecting a view mode supporting a display of historical commands applied to the storage area network, In general, the sequence of FIGS. 7, 8, 9, and 10 illustrate further techniques of searching and selectively displaying managed resources on display 130 according to embodiments of the invention.

Figure 7:
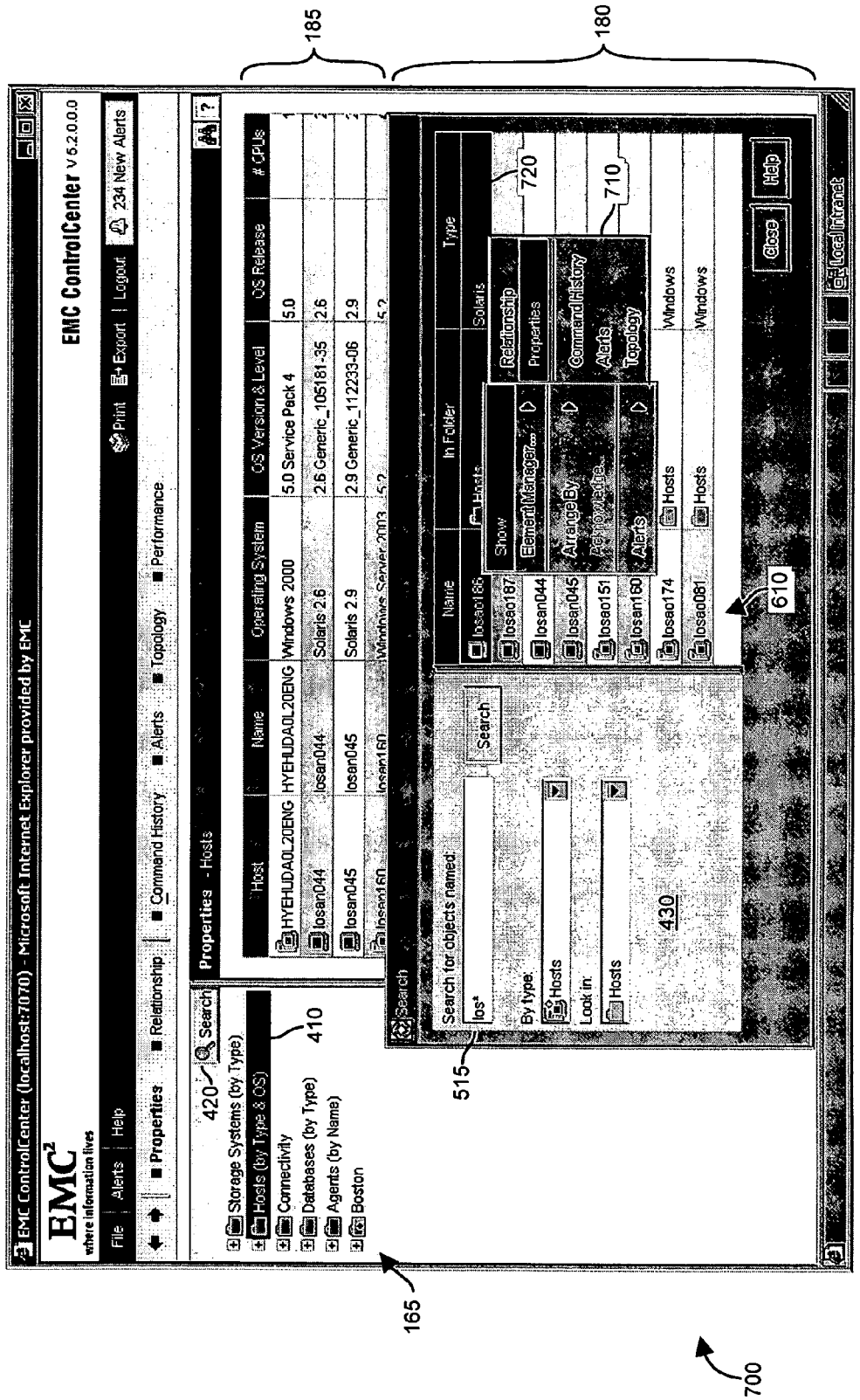
FIG. 7 is a screenshot of a graphical user interface according to an embodiment of the invention.

For example, FIG. 7 is a screenshot 700 on display 130 according to an embodiment of the invention. Similar to the previously mentioned embodiments, user 108 provides search parameters in search window 430 to produce a list of search results 610. As shown, user 108 selects (by right clicking on a mouse) entry "losao186" from the list of search results. As a result, resource manager 120 highlights the selected managed entry 720. In addition to highlighting the selected managed resource entry 720 in search results 610, the resource manager 120 provides pull-down menu 710 indicating different options for viewing additional managed resources associated with the selected managed resource 720. As shown, user 108 selects a "properties" view mode for displaying additional resources associated with the selected managed resource 720 in the second display region 185.

Figure 8:
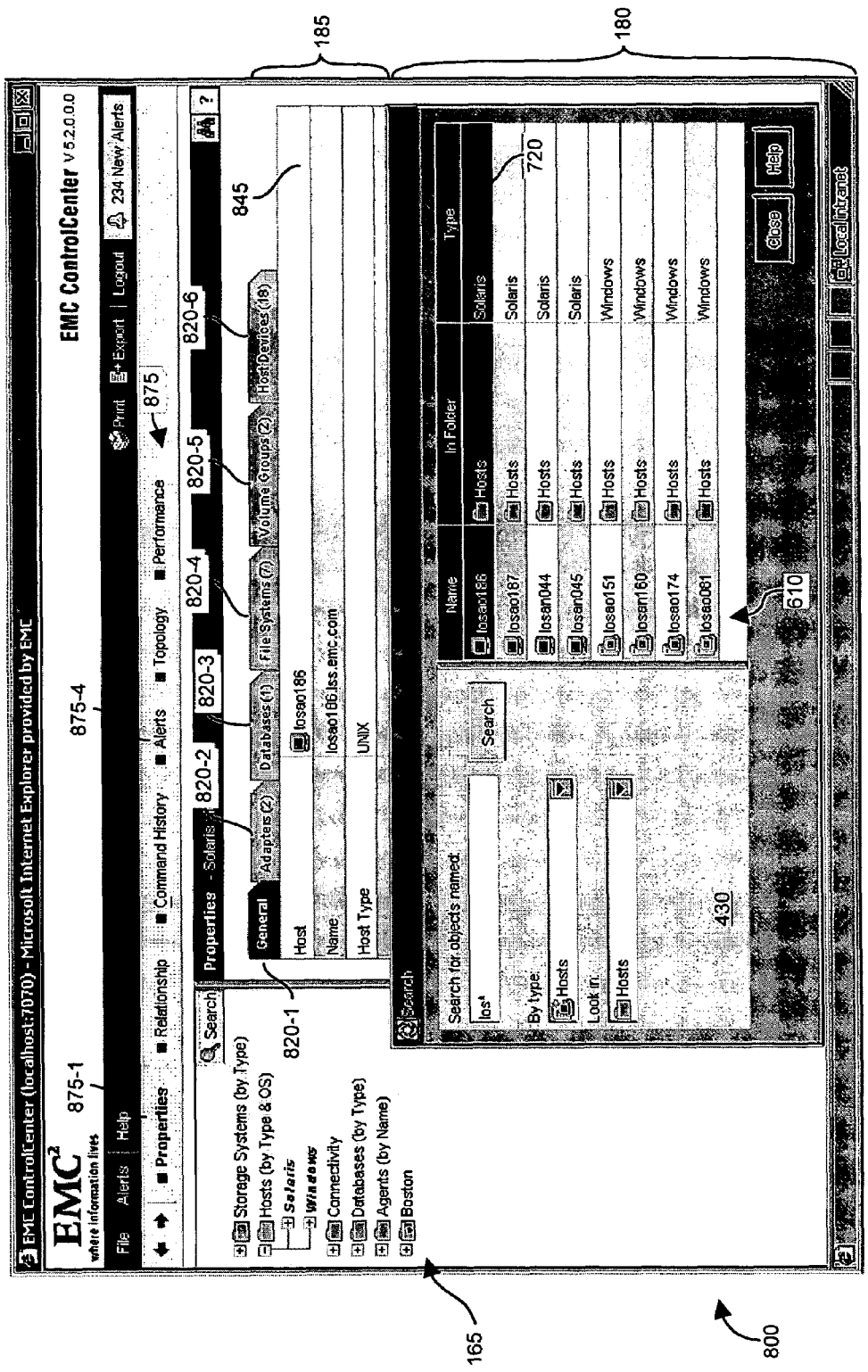
FIG. 8 is a screenshot of a graphical user interface according to an embodiment of the invention.

In furtherance of FIG. 7, FIG. 8 is a screenshot 800 on display 130 according to an embodiment of the invention. In response to receiving the command (as discussed in FIG. 7) by user 108 to display a "properties" view mode for the selected managed resource 720 "losao186" in search results 610, resource manager 120 displays table 845 in second display region 185. Resource manager 120 also highlights selectable view mode icon 875-1 to indicate that this is the present view mode of the second display region 185.

In one embodiment, to select different types of view modes of the second display region 185, the user selects one of selectable view mode icons 875. After selection of a new view mode via selection of a selectable view mode icon 875, resource manager 120 updates second display region 185 with corresponding information associated with the newly selected view mode icon 875. For example, user 108 may select an "alerts" view mode icon 875-4 to view alerts associated with the selected managed resource 720 in search results 610 instead of properties.

Figure 10:
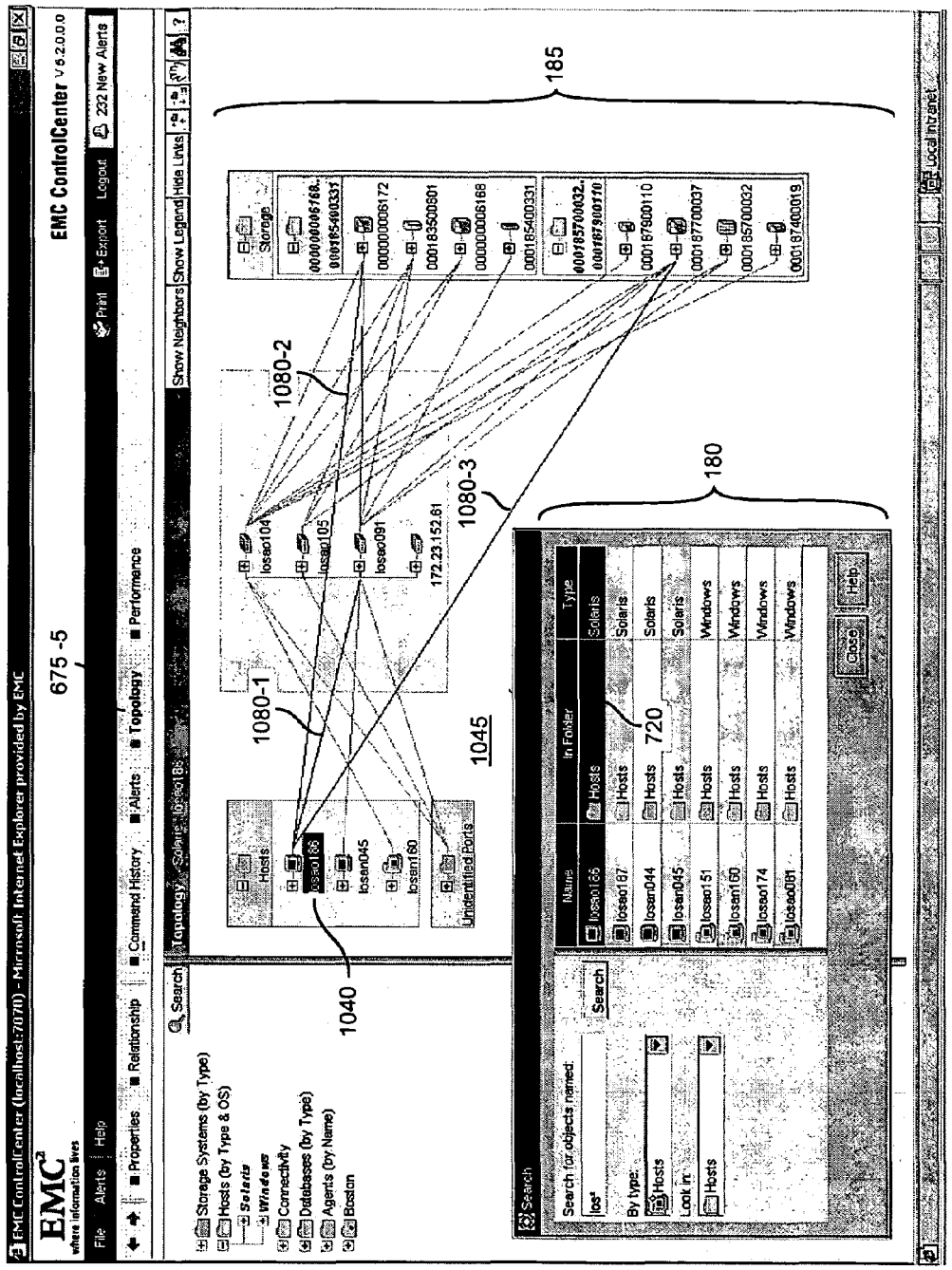
FIG. 10 is a screenshot of a graphical user interface according to an embodiment of the invention.

According to one embodiment, the resource manager 120 receives selection of a next view mode by the user to display information in the second display region 185 based on an input provided by the user 108 in the first display region 185, the next view mode being different from a present view mode currently used to display information in the second display region 185. The resource manager 180 then displays information in the second display region 185 according to the next view mode selected by the user 108 while continuing to display the results of the search in the first display region 180. Thus, the resource manager 120 enables the user 108 to selectively change a view mode of the second display region 185 between a tabular view mode (e.g., associated with properties) and a network topology view mode (e.g., associated with topology) for a particular managed resource selected in the first display region 180. The tabular view mode includes a table 845 for displaying the additional managed resource information associated with the particular managed resource selected in the first display region. The topology view mode (as shown in FIG. 10) includes symbols and connectivity paths illustrating a logical connectivity amongst the additional managed resource information associated with the particular managed resource selected in the first display region 180. Thus, a user 108 may toggle between or among different types of viewing modes for the same selected managed resource displayed in the first display region 180.

In one embodiment, the resource manager 120, while in a tabular view mode as shown, provides a set of selectable table view mode icons 820 for the user to selectively populate a corresponding table 845 in the second display region 185. The resource manager 120 continuously displays the selectable table view mode icons 820 along with the table 845 in the second display region 185. Each table view mode icon 820 in the set of selectable table view mode icons 820 includes an identifier (e.g., General, Adapters, Databases, File Systems, etc.) of a corresponding type of sub-resource to populate the corresponding table 845. The resource manager 120 populates the corresponding table 845 in the second display region 185 with a particular type of sub-resource information associated with the selected managed resource entry 720 in the first display region 180 depending which of the selectable table view mode icons 820 the user 108 selects.

The resource manager 120 highlights a selectable table view mode icon 820-1 (e.g., General, as shown) in the table 845 in the second display region 185 to identify what corresponding type of information is displayed in the corresponding table 845. The user selects different selectable table view mode icons 820 to change the type of information populated in the table 845. This is also discussed in the related application incorporated by reference.

In one application, the identifiers in the selectable table view mode icons 820 correspond to entries in the expandable tree 165. For example, the identifiers associated with the selectable view mode icons 820 correspond to managed objects that can also be viewed in the expandable tree 165 when appropriately expanded. Thus, in one embodiment of the invention, the resource manager 120 displays the sequence of selectable table view mode icons 820 enabling the user 108 to select which additional sub-resource information associated with a selected managed resource entry 720 in the first display region 180 is to be displayed in a corresponding table 845 of the second display region 185.

Figure 9:
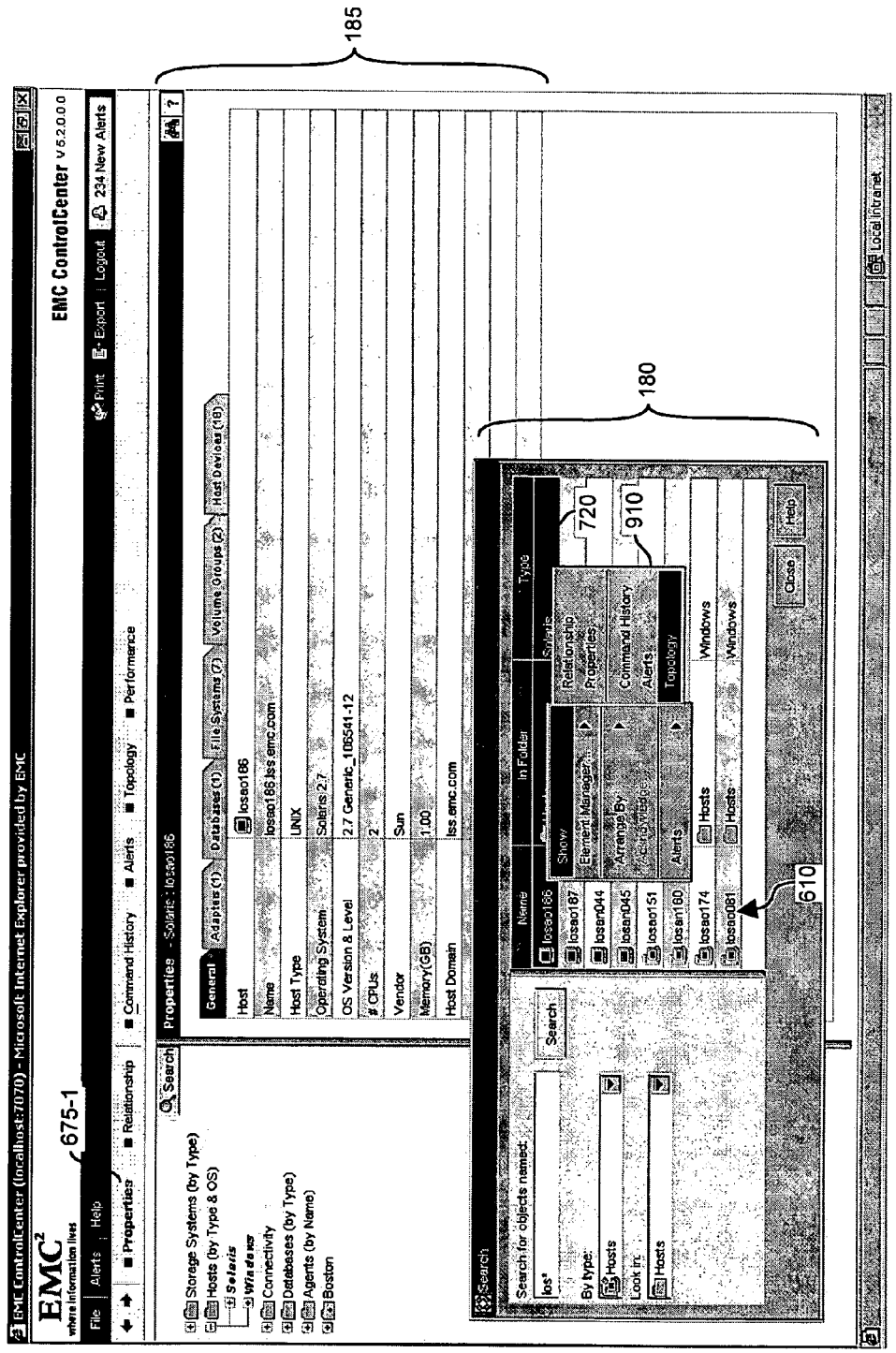
FIG. 9 is a screenshot of a graphical user interface according to an embodiment of the invention.

FIG. 9 is a screenshot 900 illustrating another method for viewing additional resources associated with selected managed resource 720 according to an embodiment of the invention. For example, user 108 right clicks on "losao186" in search results 610. In response to the selection, the resource manager 120 provides pop-up menu 910 for selecting a type of information to be displayed for the selected managed resource 720. In the present example, user 108 selects a "topology" view mode for displaying information associated with selected managed resource 720 in second display region 185.

In furtherance of FIG. 9, FIG. 10 is a screenshot 1000 on display 130 according to an embodiment of the invention. In response to receiving the command (as discussed in FIG. 9) by user 108 to display a "topology" view mode for the selected managed resource 720 "losao186," resource manager 120 displays topology view 1045 in second display region 185. Note that the resource manager 120 highlights the selected managed resource 720 to which the topology view pertains as well as a corresponding managed resource 1040 in the topology view to provide a reference point for the user 108 to identify where the corresponding selected resource 720 is located in the topology view 1045. Thus, while in the topology view 1045 according to one embodiment, the resource manager 120 highlights the selected managed resource entry 720 in the first display region 180 as well as a corresponding managed resource 1040 displayed in a physical topology view 1045 of the storage area network 300 in the second display region 185.

Topology view 1045 provides a physical connectivity of managed resources in storage area network 100 as well as a logical connectivity of managed resources associated with storage area network 300.

In one embodiment, the resource manager 120 provides highlighted connectivity paths 1080 between the corresponding managed resource in the topology view 1045 and other resources displayed in the topology view 1045 to identify a relationship between the selected managed resource 720 (or managed resource 1040) and the other resources associated with the storage area network 100. Thus, highlighted connectivity paths 1080 indicate (physical or logical) connectivity with other managed resources shown in topology view 1045. This illustrates to the user 108 which of resources in second display region 185 are associated with the selected managed resource 720 in the first display region 180.

General functionality supported by computer system 110 according to embodiments of the invention will now be discussed with respect to flowchart 1100 in FIG. 11 as discussed above with respect to FIGS. 1 through 10 above. Note that FIGS. 12-14 include more particular, but related embodiments of the invention. There will be overlap with respect to concepts discussed in the previous figures.

Figure 11:
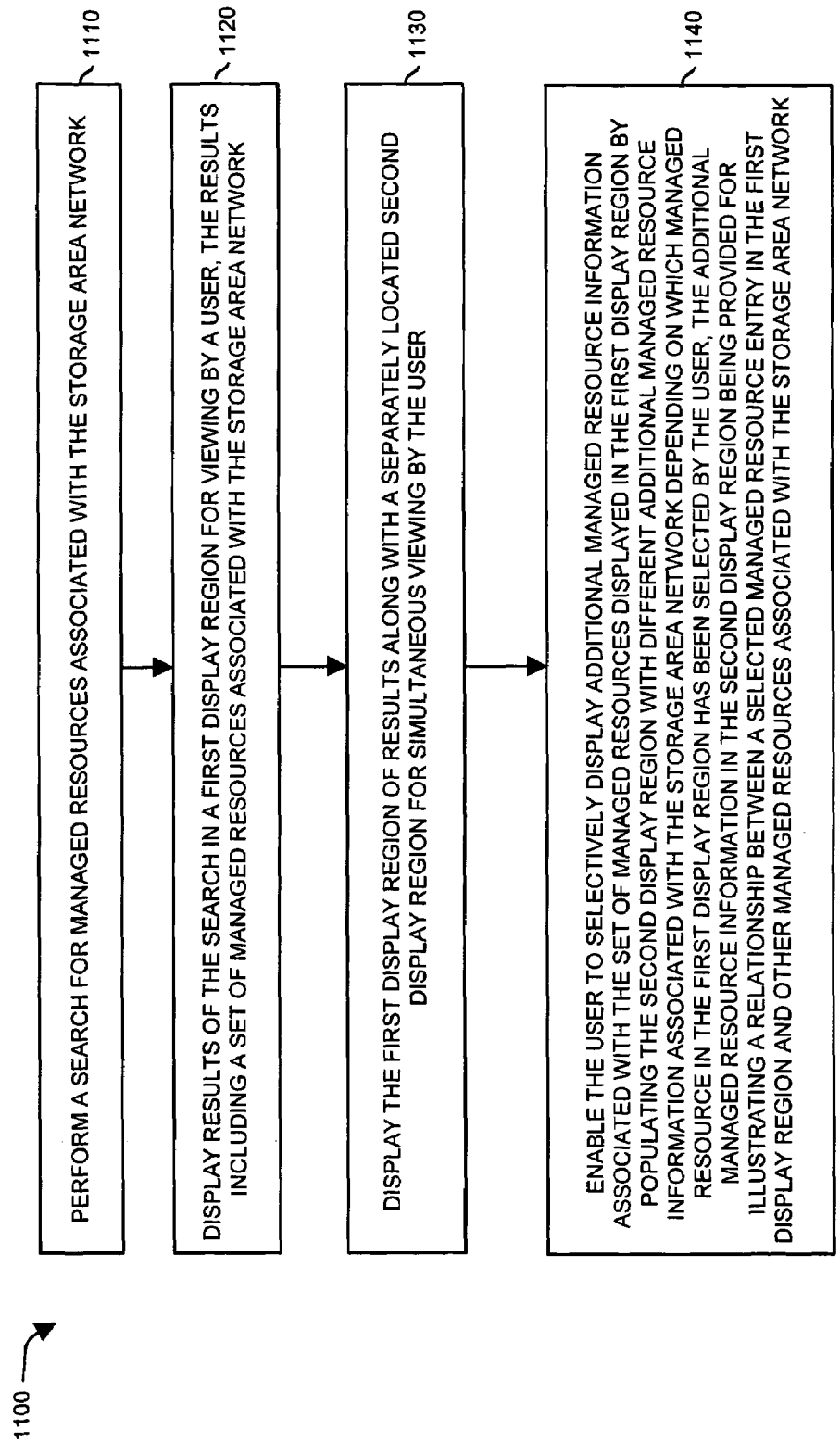
FIG. 11 is a flowchart illustrating a general technique for displaying network resources according to an embodiment of the invention.

FIG. 11 is a flowchart 1100 of processing steps performed by resource manager 120 according to an embodiment of the invention. In general, flowchart 1100 illustrates how resource manager 120 enables user 108 of the management station computer system 110 to selectively display information associated with storage area network 300. Note that the discussion of FIG. 11 will include occasional references to techniques and features discussed in the previous figures. For illustrative purposes, processor 113 (and more specifically resource manager 120) in computer system 110 in FIG. 2 performs the following operations. However, embodiments of the invention cover the general concepts as recited in the flowcharts, which may be performed by entities other than processor 113.

In step 1110, resource manager 120 performs a search for managed resources associated with a storage area network 100 (a.k.a., storage area network 300) based on input provided by user 108 in search window 430.

In step 1120, the resource manager 120 displays results of the search in a first display region 180 (more specifically, search window 430) for viewing by a user 108 on display 130. The results of the search include a set of managed resources (e.g., hosts, adapters, databases, host devices, etc.) associated with the storage area network 300.

In step 1130, the resource manager 120 displays the first display region 180 along with a separately located second display region 185 for simultaneous viewing by the user 108. Thus, a user 108 may view the first display region 180 of search results as well as the second display region 185 of additional managed resources associated with a selected managed resource in the search window 430.

In step 1140, the resource manger 120 enables the user 108 to selectively display additional managed resource information associated with the set of managed resources displayed in the first display region 180 by populating the second display region 185 with different additional managed resource information associated with the storage area network 100 depending on which managed resource in the first display region 180 has been selected by the user 108. In one embodiment, the resource manager 120 provides the additional managed resource information in the second display region 185 for illustrating a relationship between a selected managed resource entry 720 (e.g., losao186 as shown in second display FIG. 7) in the first display region 180 and other managed resources associated with the storage area network 100.

Thus, according to one embodiment of the invention, the user may select different view modes to selectively display a relationship between a selected managed resource 720 displayed in the first display region 180 and other managed resources of the storage area network 100. For example, a user 108 may select to view a relationship between a selected managed resource entry 720 in the first display region and other managed resources associated with the storage area network one way via a first view mode (e.g., a properties view mode). Based on selection of a second view mode (e.g., a topology view mode), a user 108 may view a relationship between the selected managed resource entry 720 in the first display region 180 and other managed resources associated with the storage area network 100 in another way.

Figure 12:
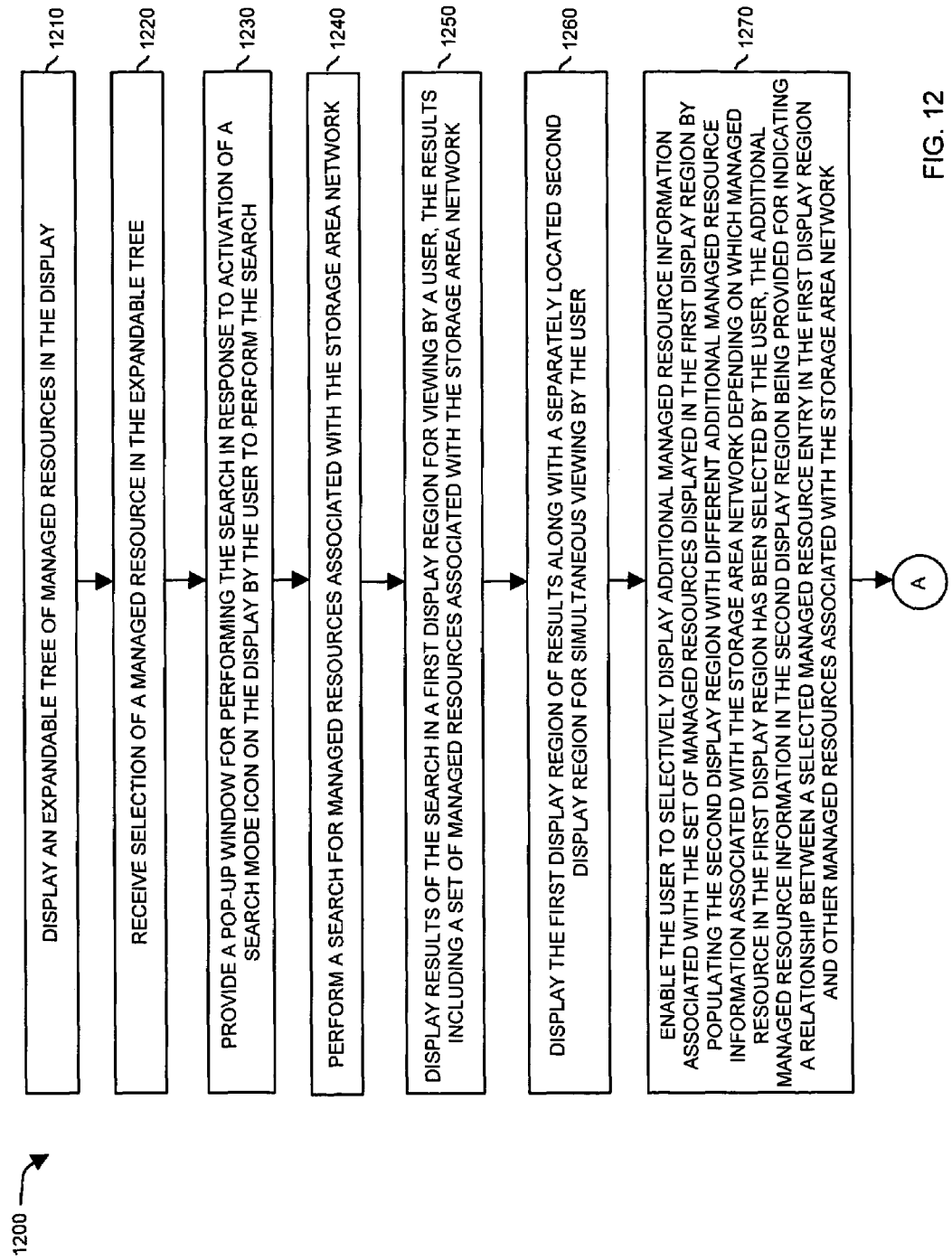
FIG. 12 is a flowchart illustrating a technique for displaying network resources according to an embodiment of the invention.
Figure 13:
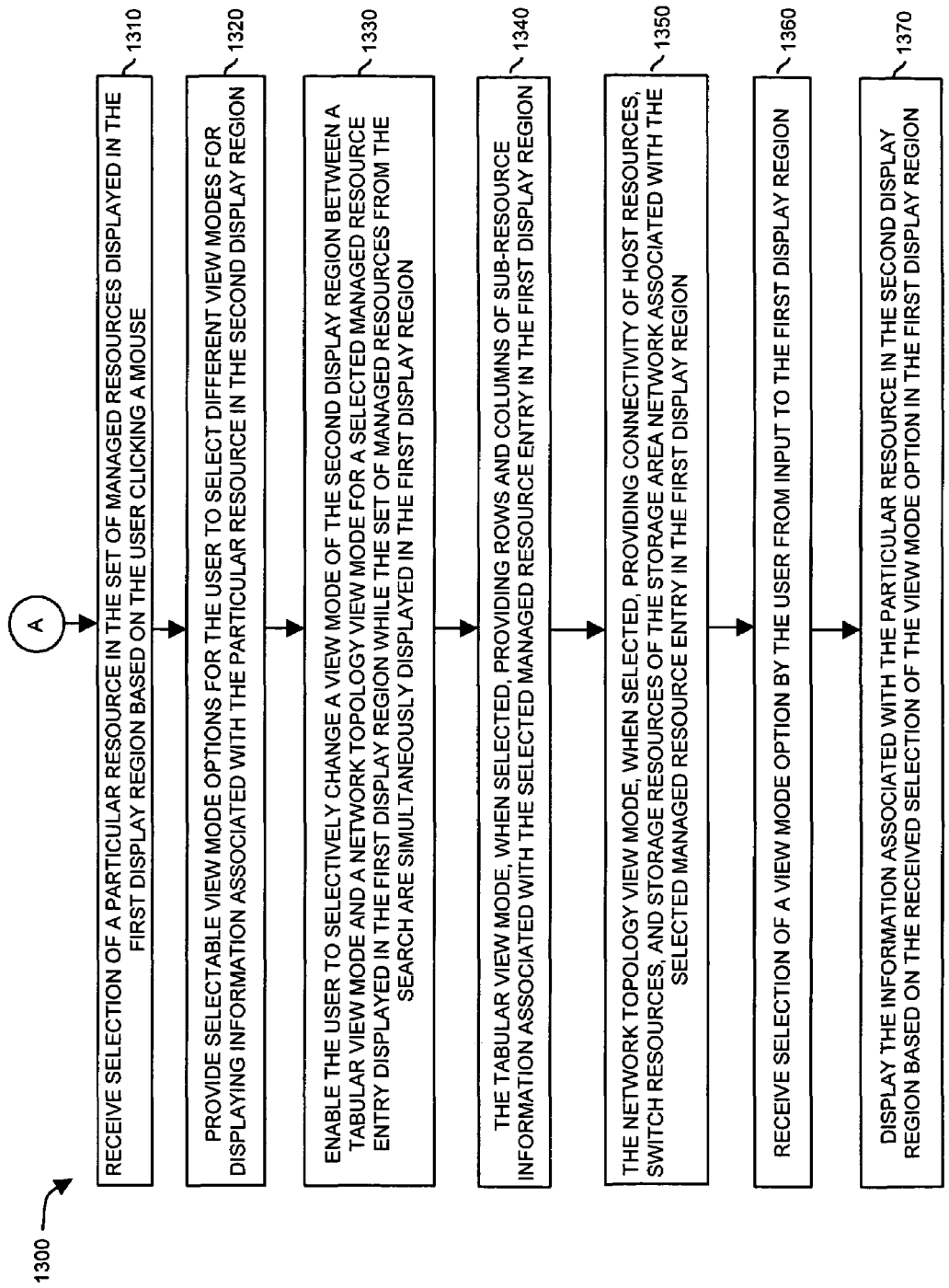
FIG. 13 is a flowchart illustrating a technique for displaying network resources according to an embodiment of the invention.

In one application, a user 108 may view a relationship of managed resources of the storage area network 100 in a tabular view mode or network topology view mode. This overall technique of providing a search capability and then enabling a user to view a relationship of managed resources based on different view modes 675 enables a user 108 to more quickly and efficiently research and review system attributes such as groupings, configurations, etc. of the storage area network 100. Maintenance of the storage area network 100 is therefore a simpler task for a network manager. FIGS. 12 and 13 combine to form a flowchart according to an embodiment of the invention. For example, flowcharts 1200 and 1300 illustrate techniques of providing search capability and enabling user 108 to efficiently display different types of results associated with a selected managed resource in the first display region 180.

Referring now more specifically to flowchart 1200 in FIG. 12, in step 1210, the resource manager 120 displays an expandable tree 165 of managed resources on a display screen 130 for user 108.

In step 1220, based on input from the user 108, the resource manager 120 receives selection of a managed resource in the expandable tree 165.

In step 1230, in response to activation of a search mode button 420 (which is potentially continuously displayed in relation to the expandable tree 165) by the user 108 to initiate a search, the resource manager 120 provides a search window 430 (e.g., pop-up window) for entering search parameters to be used in a corresponding search.

In step 1240, based on the search parameters provided by user 108, the resource manager 120 performs a search for corresponding managed resources associated with the storage area network 100. The search may involve searching the expandable tree 165 for resource entries of a particular type, name, etc.

In step 1250, the resource manager 120 displays results of the search in a first display region 180 for viewing by user 108. The results of the search include a set of managed resources (e.g., a particular type of hosts) associated with the storage area network.

In step 1260, the resource manager 120 displays the first display region of search results along with a separately located and maintained second display region 185 of resources for simultaneous viewing by the user 108.

In step 1270, the resource manger 120 enables the user 108 to selectively display additional managed resource information associated with the set of managed resources 610 displayed in the first display region 180 (e.g., search window 430) by populating the second display region 185 with different additional managed resource information associated with the storage area network 100 depending on which managed resource in the first display region 180 has been selected by the user 108. In one embodiment, the resource manager 120 provides the additional managed resource information in the second display region 185 being provided for indicating a relationship between a selected managed resource entry 720 (e.g., losao186 as shown in second display FIG. 7) in the first display region 180 and other managed resources associated with the storage area network 100. As discussed, the user 108 may utilize selectable view mode icons 675 and/or pull down menu 710 to modify which type of information resource manager 120 displays in second display region 185 with respect to a selected managed resource entry 720.

Referring now more specifically to flowchart 1300 in FIG. 13, in step 1310, the resource manager 120 receives selection of a particular managed resource 720 from the set of managed 610 resources displayed in the first display region 180 based on, for example, the user 108 clicking a mouse.

In step 1320, in response, the resource manager 120 then provides selectable view mode icons 675 (e.g., selectable view mode options) in first display region 180 for the user 108 to select different view modes for displaying information associated with the particular selected managed resource 720 in the second display region 185. In one application, the user 108 right clicks an entry (e.g., a managed resource of the storage area network) in the first display region 180 to select, via a pull-down menu 710, how to display corresponding managed resources (e.g., table, topology view, alerts information, etc.) associated with the "clicked on" entry (e.g., selected managed resource 720) in the second display region 185.

In step 1330, the resource manager 120 enables the user to selectively change between two or more different view modes of the second display region 185 such as between a tabular view mode and a network topology view mode. As discussed, other embodiments of the invention support select viewing of a properties view mode, relationship view mode, command history view mode, alerts view mode, topology view mode, and performance view mode associated with the storage area network 100.

In step 1340, the tabular view mode, when selected as a display mode for the second display region 185, includes rows and columns of sub-resource information associated with the selected managed resource entry 720 in the first display region 180.

In step 1350, the network topology view mode, when selected as a display mode for the second display region, provides an illustration of connectivity of host resources, switch resources, and storage resources of the storage area network associated with the selected managed resource entry in the first display region.

In step 1360, the resource manager 120 receives a selection of a view mode by the user 108 from input to the first display region such as the pull-down menu 710 from the search window 430.

In step 1370, the resource manager 120 displays the information associated with the particular resource in the second display region 185 based on the received selection of the view mode option (e.g., pull-down menu 710) in the first display region 185. In other words, a user 108 selects a view mode of the second display region 185 based on selection of a view mode option din pull-down menu 710 displayed in the first display region 180.

Figure 14:
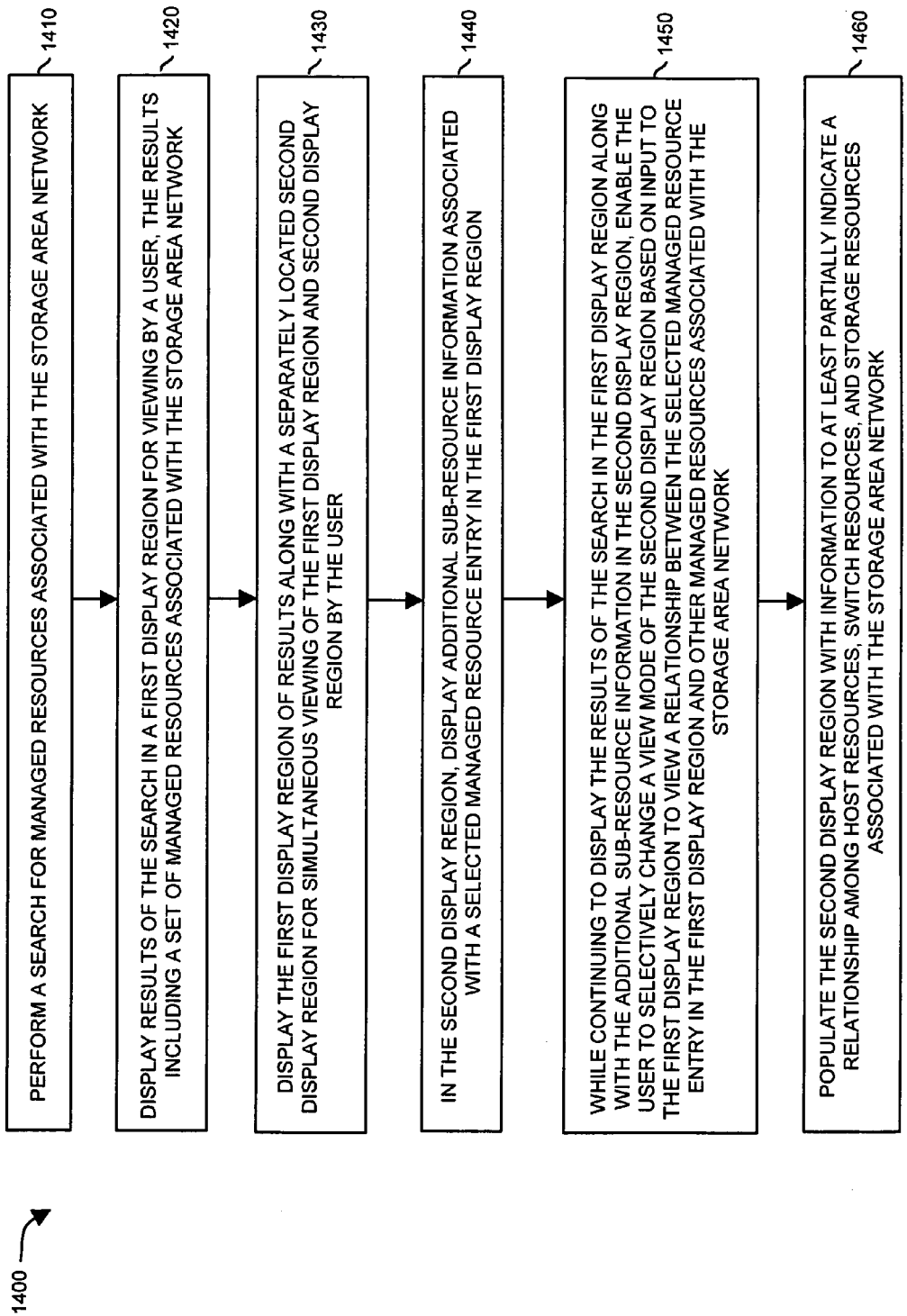
FIG. 14 is a flowchart illustrating a technique for displaying network resources according to an embodiment of the invention.

FIG. 14 is a flowchart 1400 of processing steps performed by resource manager 120 according to an embodiment of the invention. Flowchart 1400 more particularly illustrates a technique of enabling a user 108 to selectively change a view mode associated with managed resources displayed in the second display region 185 according to an embodiment of the invention.

In step 1410, the resource manager 120 performs a search for managed resources associated with the storage area network 100 based on input from a user 108.

In step 1420, the resource manager 120 then displays results of the search in a first display region 180 for viewing by a user 108. The results of the search include a set of managed resources 610 associated with the storage area network 100.

In step 1430, the resource manager 120 displays the first display region 180 of results along with a separately located second display region 185 for simultaneous viewing of the first display region 180 and second display region 185 by the user 108.

In step 1440, the resource manager 120 displays, in the second display region 185, additional sub-resource information associated with a selected managed resource entry 710 in the first display region 180.

In step 1450, while continuing to display the results of the search in the first display region along with the additional sub-resource information in the second display region, the resource manager enables the user to selectively change a view mode of the second display region based on input to the first display region to view a relationship between the selected managed resource entry in the first display region and other managed resources associated with the storage area network. For example, the resource manager enables the user to selectively change a view mode of the second display region between a tabular view mode and a network topology view mode based on an input command to the first display region, both of which display the additional sub-resource information to the users in the second display region but in different ways.

In step 1460, the resource manager populates the second display region with information to at least partially indicate a relationship among host resources 301, switch resources 302, and storage resources 303 associated with the storage area network 100.

As discussed, techniques of the invention are well suited for use in applications in which a network manager or user manages a storage area network including many managed resources that are not easily displayed in an expandable hierarchical tree and especially applications that provide a benefit of viewing a relationship of managed resources associated with a storage area network. However, it should be noted that embodiments of the invention are not limited to use in such applications and, thus, embodiments of the invention are well suited for other applications as well.

While this invention has been particularly shown and described with references to preferred embodiments thereof, it will be understood by those skilled in the art that various changes in form and details may be made therein without departing from the spirit and scope of the invention as defined by the appended claims. Such variations are intended to be covered by the scope of this invention. As such, the foregoing description of embodiments of the invention is not intended to be limiting. Rather, any limitations to embodiments of the invention are presented in the following claims.

What is claimed is:

1. A method for providing information associated with a storage area network on a display, the method comprising steps of:

via processing provided by a computer device:

displaying a search symbol in a vicinity of an expandable hierarchical tree;

in response to receiving selection of the search symbol, populating a first display region of the display to include a search window;

based on search criteria inputted to the search window, performing a search in the expandable hierarchical tree for managed resources associated with the storage area network;

displaying results of the search in the first display region for viewing by a user, the results including a set of managed resources associated with the storage area network;

displaying the first display region of results along with a separately located second display region for simultaneous viewing by the user;

enabling the user to selectively display additional managed resource information associated with the set of managed resources displayed in the first display region by populating the second display region with different additional managed resource information associated with the storage area network depending on which managed resource in the first display region has been selected by the user, the additional managed resource information in the second display region being provided for illustrating a relationship between a selected managed resource entry in the first display region and other managed resources associated with the storage area network; and in the second display region, displaying a sequence of table view mode icons enabling the user to select which additional sub-resource information associated with a selected managed resource entry in the first display region to display in a corresponding table of the second region, at least two of the table view mode icons corresponding to entries in the expandable tree based on which the search was performed;

prior to performing the search, receiving notification of a selected resource folder from the expandable hierarchical tree, the expandable hierarchical tree including identifiers of resources in the storage area network, the expandable hierarchical tree displayed in a separate display region than the first display region;

receiving search criteria for applying to the selected resource folder in the expandable hierarchical tree;

wherein performing the search includes applying the search criteria to identify multiple sub-resources in the selected resource folder that satisfy the search, the multiple sub-resources being the set of managed resources identified during the search;

displaying identities of the multiple sub-resources in the search window displayed in the first display region, each of the multiple sub-resources being a selectable resource that can be viewed in more detail in the corresponding table in the second display region;

based on receiving the selection of a given sub-resource of the multiple sub-resources displayed in the search window, providing a visual indication in the search window to indicate that the give sub-resource has been selected from the multiple sub-resources;

initiating display of a menu in the search window, the menu including multiple different display options for viewing different types of information in the second display region, a first display option of the multiple different display options enabling the user to display information associated with the given sub-resource in the corresponding table, a second display option of the multiple different display options enabling the user to display information associated with the given sub-resource in a physical topology view; and in response to receiving selection of the given sub-resource of the multiple sub-resources displayed in the search window in the first display region and receiving selection of an entry in the menu, initiating display of corresponding information associated with the given sub-resource in the corresponding table of the second display region;

wherein the sequence of table view mode icons in the second display region are selectable resource identifiers specifying resources that also can be selectively viewed in an expanded version of the selected resource folder in the expandable hierarchical tree;

wherein the table view mode icons in the second display region enable the user to select which type of additional sub-resource information associated with a selected sub-resource of the multiple sub-resources in the first display region are to be subsequently displayed in the corresponding table of the second display region in the second display region, providing a first visual indication, the first visual indication indicating which particular table view mode icon in the sequence of table view mode icons has been selected by the user, the visual indication in the second display region indicating a type of sub-resource information displayed in the corresponding table;

continuing to display the sequence of table view mode icons even though the particular view mode icon has been selected by the user;

while continuing to display the sequence of table view mode icons, providing a second visual indication, the second visual indication indicating that the user can select from the sequence of table view mode icons other than the particular table view mode icon, selection of another view mode icon other than the particular view mode icon causing repopulating of the corresponding table with resource data to display a different type of sub-resource information associated with the selected managed resource entry in the first display region depending on which of the view mode icons is subsequently selected by the user.

2. A method as in claim 1 further comprising:

receiving selection of a next view mode by the user to display information in the second display region based on an input provided by the user in the first display region, the next view mode being different from a present view mode currently used to display information in the second display region; and displaying information in the second display region according to the next view mode selected by the user while continuing to display the results of the search in the first display region.

3. A method as in claim 1 further comprising:

enabling the user to selectively change a view mode of the second display region between a tabular view mode and a network topology view mode for a particular managed resource selected in the first display region, the tabular view mode including the corresponding table for displaying the additional managed resource information associated with the particular managed resource selected in the first display region, the network topology view mode including symbols and connectivity paths illustrating a logical connectivity amongst the additional managed resource information associated with the particular managed resource selected in the first display region.

4. A method as in claim 1 further comprising:

receiving selection of a particular resource in the set of managed resources displayed in the first display region based on the user clicking a mouse;

providing selectable view mode options for the user to select different view modes for displaying information associated with the particular resource in the second display region;

receiving selection of a view mode option by the user from input to the first display region; and displaying the information associated with the particular resource in the second display region based on the received selection of the view mode option in the first display region.

5. A method as in claim 4, wherein providing the selectable view mode options enables the user to selectively change a view mode of the second display region between a tabular view mode and a network topology view mode for a selected managed resource entry displayed in the first display region while the set of managed resources from the search are simultaneously displayed in the first display region;

the tabular view mode, when selected, providing rows and columns of sub-resource information associated with the selected managed resource entry in the first display region; and the network topology view mode, when selected, providing connectivity of host resources, switch resources, and storage resources of the storage area network associated with the selected managed resource entry in the first display region.

6. A method as in claim 5 further comprising:

while in the tabular view mode:

providing the sequence of table view mode icons for the user to selectively populate the a corresponding table in the second display region, the table view mode icons being continuously displayed along with the corresponding table in the second display region, each table view mode icon in the sequence having an identifier of a corresponding type of sub-resource in which to populate the corresponding table; and populating the corresponding table in the second display region with a particular type of sub-resource information associated with the selected managed resource entry in the first display region depending on which of the table view mode icons the user selects.

7. A method as in claim 5 further comprising:

while in the network topology view mode:

highlighting the selected managed resource entry in the first display region as well as a corresponding managed resource displayed in a physical topology view of the storage area network in the second display region.

8. A method as in claim 7 further comprising:

providing highlighted connectivity paths between the corresponding managed resource in the physical topology view and other resources displayed in the physical topology view to identify a relationship between the corresponding managed resource and the other resources associated with the storage area network displayed in the physical topology view.

9. A computer system for displaying management information associated with a storage area network, the computer system comprising:

a processor;

a memory unit that stores instructions associated with an application executed by the processor; and an interconnect coupling the processor and the memory unit, enabling the computer system to execute the application and perform operations of:

displaying a search symbol in a vicinity of an expandable hierarchical tree;

in response to receiving selection of the search symbol, populating a first display region of the display to include a search window;

based on search criteria inputted to the search window, performing a search in the expandable hierarchical tree for managed resources associated with the storage area network;

displaying results of the search in the first display region for viewing by a user, the results including a set of managed resources associated with the storage area network;

displaying the first display region of results along with a separately located second display region for simultaneous viewing by the user;

enabling the user to selectively display additional managed resource information associated with the set of managed resources displayed in the first display region by populating the second display region with different additional managed resource information associated with the storage area network depending on which managed resource in the first display region has been selected by the user, the additional managed resource information in the second display region being provided for illustrating a relationship between a selected managed resource entry in the first display region and other managed resources associated with the storage area network; and in the second display region, displaying a sequence of table view mode icons enabling the user to select which additional sub-resource information associated with a selected managed resource entry in the first display region to display in a corresponding table of the second region, at least two of the table view mode icons corresponding to entries in the expandable tree based on which the search was performed;

prior to performing the search, receiving notification of a selected resource folder from the expandable hierarchical tree, the expandable hierarchical tree including identifiers of resources in the storage area network, the expandable hierarchical tree displayed in a separate display region than the first display region;

receiving search criteria for applying to the selected resource folder in the expandable hierarchical tree;

wherein performing the search includes applying the search criteria to identify multiple sub-resources in the selected resource folder that satisfy the search, the multiple sub-resources being the set of managed resources identified during the search;

displaying identities of the multiple sub-resources in the search window displayed in the first display region, each of the multiple sub-resources being a selectable resource that can be viewed in more detail in the corresponding table in the second display region;

based on receiving the selection of a given sub-resource of the multiple sub-resources displayed in the search window, providing a visual indication in the search window to indicate that the give sub-resource has been selected from the multiple sub-resources;

initiating display of a menu in the search window, the menu including multiple different display options for viewing different types of information in the second display region, a first display option of the multiple different display options enabling the user to display information associated with the given sub-resource in the corresponding table, a second display option of the multiple different display options enabling the user to display information associated with the given sub-resource in a physical topology view; and in response to receiving selection of the given sub-resource of the multiple sub-resources displayed in the search window in the first display region and receiving selection of an entry in the menu, initiating display of corresponding information associated with the given sub-resource in the corresponding table of the second display region;

wherein the sequence of table view mode icons in the second display region are selectable resource identifiers specifying resources that also can be selectively viewed in an expanded version of the selected resource folder in the expandable hierarchical tree;

wherein the table view mode icons in the second display region enable the user to select which type of additional sub-resource information associated with a selected sub-resource of the multiple sub-resources in the first display region are to be subsequently displayed in the corresponding table of the second display region in the second display region, providing a first visual indication, the first visual indication indicating which particular table view mode icon in the sequence of table view mode icons has been selected by the user, the visual indication in the second display region indicating a type of sub-resource information displayed in the corresponding table;

continuing to display the sequence of table view mode icons even though the particular view mode icon has been selected by the user;

while continuing to display the sequence of table view mode icons, providing a second visual indication, the second visual indication indicating that the user can select from the sequence of table view mode icons other than the particular table view mode icon, selection of another view mode icon other than the particular view mode icon causing repopulating of the corresponding table with resource data to display a different type of sub-resource information associated with the selected managed resource entry in the first display region depending on which of the view mode icons is subsequently selected by the user.

10. A computer system as in claim 9 further supporting operations of:
receiving selection of a particular resource in the set of managed resources displayed in the first display region based on the user clicking a mouse;
providing selectable view mode options for the user to select different view modes for displaying information associated with the particular resource in the second display region;
receiving selection of a view mode option by the user from input to the first display region; and
displaying the information associated with the particular resource in the second display region based on the received selection of the view mode option in the first display region.

11. A computer system as in claim 10, wherein providing the selectable view mode options enables the user to selectively change a view mode of the second display region between a tabular view mode and a network topology view mode for a selected managed resource entry displayed in the first display region while the set of managed resources from the search are simultaneously displayed in the first display region;
the tabular view mode, when selected, providing rows and columns of sub-resource information associated with the selected managed resource entry in the first display region; and
the network topology view mode, when selected, providing connectivity of host resources, switch resources, and storage resources of the storage area network associated with the selected managed resource entry in the first display region.

12. A computer system as in claim 11 further supporting operations of:
while in the tabular view mode:
providing a set of selectable table view mode icons for the user to selectively populate a corresponding table in the second display region, the selectable table view mode icons being continuously displayed along with the table in the second display region, each table view mode icon in the set of selectable table view mode icons including an identifier of a corresponding type of sub-resource to populate the corresponding table; and
populating the corresponding table in the second display region with a particular type of sub-resource information associated with the selected managed resource entry in the first display region depending which of the selectable table view mode icons the user selects.

13. A computer system as in claim 12 further supporting operations of:
highlighting a selectable table view mode icon in the table in the second display region to identify what information is displayed in the corresponding table.

14. A computer system as in claim 11 further supporting operations of:
while in the network topology view mode:
highlighting the selected managed resource entry in the first display region as well as a corresponding managed resource displayed in a physical topology view of the storage area network in the second display region.

15. A computer system as in claim 14 further supporting operations of:
providing highlighted connectivity paths between the corresponding managed resource in the physical topology view and other resources displayed in the physical topology view to identify a relationship between the corresponding managed resource and the other resources associated with the storage area network displayed in the physical topology view.

* * * * *